(12) United States Patent
Kearns et al.

(10) Patent No.: US 9,406,094 B2
(45) Date of Patent: *Aug. 2, 2016

(54) METHOD AND APPARATUS FOR DELIVERING POWER USING EXTERNAL DATA

(71) Applicant: STEM Inc., Millbrae, CA (US)

(72) Inventors: Ben Kearns, San Francisco, CA (US); Jon Burlinson, San Jose, CA (US); Drew Stevens, San Francisco, CA (US)

(73) Assignee: Stem Inc., Millbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,256

(22) Filed: Aug. 14, 2013

(65) Prior Publication Data

US 2014/0049109 A1 Feb. 20, 2014

Related U.S. Application Data

(60) Provisional application No. 61/683,113, filed on Aug. 14, 2012, provisional application No. 61/693,684, filed on Aug. 27, 2012, provisional application No. 61/801,274, filed on Mar. 15, 2013.

(51) Int. Cl.
*G06Q 50/06* (2012.01)
*H02J 3/00* (2006.01)
(Continued)

(52) U.S. Cl.
CPC . *G06Q 50/06* (2013.01); *H02J 3/00* (2013.01); *H02J 3/32* (2013.01); *H02J 4/00* (2013.01);
(Continued)

(58) Field of Classification Search
CPC ........... H02J 3/00; H02J 3/32; H02J 13/0006; H02J 4/00; G06Q 50/06

USPC .................................. 307/52; 700/295, 297
See application file for complete search history.

(56) References Cited

U.S. PATENT DOCUMENTS

| | | | |
|---|---|---|---|
| 3,487,289 A | 12/1969 | McMurray | |
| 4,121,147 A | 10/1978 | Becker et al. | |

(Continued)

FOREIGN PATENT DOCUMENTS

| | | |
|---|---|---|
| EP | 2101403 A2 | 9/2009 |
| EP | 2 204 658 A1 | 7/2010 |

(Continued)

OTHER PUBLICATIONS

M.A. Kai, "Lessons Learned from the Texas Synchrophasor Network", IEEE-PES Innovative Smart Grid Technologies Conference, Berlin, Oct. 14-17, 2012.

(Continued)

*Primary Examiner* — Michael D Masinick
(74) *Attorney, Agent, or Firm* — Artegis Law Group, LLP

(57) ABSTRACT

A control system for an energy storage system located behind a utility meter uses a unique, feedback-based, communication and control method to reliably and efficiently maximize economic return of the energy storage system. Operating parameters for the energy storage system are calculated at an external, centralized data center, and are selected to prevent electrical power demand of an electric load location from exceeding a specified set-point by discharging energy storage devices, such as DC batteries, through a bidirectional energy converter during peak demand events. The control system can operate autonomously in the case of a communications failure.

24 Claims, 22 Drawing Sheets

(51) Int. Cl.
  *H02J 4/00* (2006.01)
  *H02J 3/32* (2006.01)
  *H02J 13/00* (2006.01)
(52) U.S. Cl.
  CPC ............ *H02J 13/0006* (2013.01); *Y02E 40/76* (2013.01); *Y02E 60/722* (2013.01); *Y02P 80/11* (2015.11); *Y04S 10/14* (2013.01); *Y04S 10/545* (2013.01); *Y10T 307/549* (2015.04)

(56) References Cited

U.S. PATENT DOCUMENTS

| | | | |
|---|---|---|---|
| 4,287,465 A | 9/1981 | Godard et al. | |
| 4,399,396 A | 8/1983 | Hase | |
| 4,559,590 A | 12/1985 | Davidson | |
| 4,752,697 A | 6/1988 | Lyons et al. | |
| 4,847,745 A | 7/1989 | Shekhawat et al. | |
| 4,996,637 A | 2/1991 | Piechnick | |
| 5,262,931 A | 11/1993 | Vingsbo | |
| 5,274,571 A | 12/1993 | Hesse et al. | |
| 5,369,353 A | 11/1994 | Erdman | |
| 5,510,700 A | 4/1996 | Pomatto | |
| 5,594,318 A | 1/1997 | Nor et al. | |
| 5,595,506 A | 1/1997 | Robinson et al. | |
| 5,620,337 A | 4/1997 | Pruehs | |
| 5,834,923 A * | 11/1998 | Lewin et al. | 320/147 |
| 5,909,367 A | 6/1999 | Change | |
| 6,015,314 A | 1/2000 | Benfante | |
| 6,018,203 A | 1/2000 | David et al. | |
| 6,059,605 A | 5/2000 | Robinson et al. | |
| 6,160,722 A | 12/2000 | Thommes et al. | |
| 6,172,480 B1 | 1/2001 | Vandelac | |
| 6,200,158 B1 | 3/2001 | Robinson | |
| 6,268,715 B1 | 7/2001 | Oglesbee et al. | |
| 6,301,132 B1 | 10/2001 | Vandelac | |
| 6,310,789 B1 | 10/2001 | Nebrigic et al. | |
| 6,388,421 B2 | 5/2002 | Abe | |
| 6,404,655 B1 | 6/2002 | Welches | |
| 6,420,801 B1 | 7/2002 | Seefeldt | |
| 6,424,119 B1 | 7/2002 | Nelson et al. | |
| 6,429,625 B1 | 8/2002 | LeFevre et al. | |
| 6,522,031 B2 | 2/2003 | Provanzana et al. | |
| 6,587,362 B1 | 7/2003 | Vithayathil | |
| 6,606,552 B2 | 8/2003 | Haimerl et al. | |
| 6,639,383 B2 | 10/2003 | Nelson et al. | |
| 6,750,685 B1 | 6/2004 | Guerrero Mercado | |
| 7,019,666 B2 | 3/2006 | Tootoonian Mashhad et al. | |
| 7,031,859 B2 | 4/2006 | Piesinger | |
| 7,058,484 B1 * | 6/2006 | Potega | 700/297 |
| 7,157,810 B2 | 1/2007 | Kanouda et al. | |
| 7,199,527 B2 | 4/2007 | Holman | |
| 7,248,490 B2 | 7/2007 | Olsen et al. | |
| 7,262,694 B2 | 8/2007 | Olsen et al. | |
| 7,385,373 B2 | 6/2008 | Doruk et al. | |
| 7,456,519 B2 | 11/2008 | Takeda et al. | |
| 7,676,334 B2 | 3/2010 | Matsuura et al. | |
| 7,747,739 B2 | 6/2010 | Bridges et al. | |
| 7,752,145 B2 | 7/2010 | Kelty | |
| 7,804,183 B2 | 9/2010 | Arinaga | |
| 7,929,327 B2 * | 4/2011 | Haines et al. | 363/95 |
| 7,933,695 B2 | 4/2011 | Yamaguchi | |
| 8,053,921 B2 | 11/2011 | Ichikawa | |
| 8,125,183 B2 | 2/2012 | Katsunaga | |
| 8,149,114 B2 | 4/2012 | Hanft | |
| 8,183,995 B2 | 5/2012 | Wang et al. | |
| 8,698,462 B2 * | 4/2014 | Lawson et al. | 323/206 |
| 8,823,213 B2 * | 9/2014 | Matsuda | H02J 3/383 307/84 |
| 2002/0019758 A1 | 2/2002 | Scarpelli | |
| 2002/0171436 A1 | 11/2002 | Russell | |
| 2002/0173902 A1 | 11/2002 | Haimerl et al. | |
| 2002/0190525 A1 | 12/2002 | Worden et al. | |
| 2003/0007369 A1 | 1/2003 | Gilbreth et al. | |
| 2003/0057919 A1 | 3/2003 | Yang | |
| 2004/0062059 A1 | 4/2004 | Cheng et al. | |
| 2004/0262996 A1 | 12/2004 | Olsen et al. | |
| 2004/0263116 A1 | 12/2004 | Doruk et al. | |
| 2006/0023478 A1 | 2/2006 | Takeda et al. | |
| 2006/0141093 A1 | 6/2006 | Leu | |
| 2007/0005195 A1 | 1/2007 | Pasquale et al. | |
| 2007/0117436 A1 | 5/2007 | Davis | |
| 2007/0145952 A1 | 6/2007 | Arcena | |
| 2007/0200433 A1 | 8/2007 | Kelty | |
| 2007/0210728 A1 * | 9/2007 | Musser | 318/53 |
| 2007/0213891 A1 * | 9/2007 | Musser | 701/22 |
| 2008/0012667 A1 | 1/2008 | Colsch et al. | |
| 2008/0040295 A1 * | 2/2008 | Kaplan et al. | 705/412 |
| 2008/0141918 A1 | 6/2008 | McClintock | |
| 2008/0178215 A1 | 7/2008 | Nishigaki | |
| 2008/0183408 A1 | 7/2008 | Matsuura et al. | |
| 2008/0272934 A1 | 11/2008 | Wang et al. | |
| 2009/0102424 A1 | 4/2009 | Tien et al. | |
| 2009/0146423 A1 | 6/2009 | Arinaga | |
| 2009/0160259 A1 | 6/2009 | Naiknaware et al. | |
| 2009/0288896 A1 | 11/2009 | Ichikawa | |
| 2010/0034003 A1 | 2/2010 | Rozman et al. | |
| 2010/0082464 A1 | 4/2010 | Keefe | |
| 2010/0114387 A1 | 5/2010 | Chassin | |
| 2010/0138363 A1 * | 6/2010 | Batterberry et al. | 705/412 |
| 2010/0218108 A1 * | 8/2010 | Crabtree | G06Q 50/06 715/738 |
| 2011/0202196 A1 * | 8/2011 | Venkatakrishnan et al. | 700/295 |
| 2011/0221195 A1 | 9/2011 | Raju | |
| 2011/0288691 A1 * | 11/2011 | Abe et al. | 700/292 |
| 2011/0296218 A1 * | 12/2011 | Kim et al. | 713/323 |
| 2012/0069619 A1 | 3/2012 | Badger et al. | |
| 2012/0271475 A1 * | 10/2012 | Wang et al. | 700/295 |
| 2012/0319748 A1 | 12/2012 | Luo | |
| 2013/0030588 A1 | 1/2013 | Smith et al. | |
| 2013/0030590 A1 * | 1/2013 | Prosser | 700/295 |
| 2014/0088781 A1 * | 3/2014 | Kearns et al. | 700/295 |

FOREIGN PATENT DOCUMENTS

| | | |
|---|---|---|
| EP | 2 475 059 A1 | 7/2012 |
| JP | 2002-305842 A | 10/2002 |
| JP | 2002305842 | 10/2002 |
| JP | 2006-141093 A | 6/2006 |
| JP | 2006-338889 A | 12/2006 |
| JP | 2006338889 | 12/2006 |
| JP | 2008-141918 A | 6/2008 |
| JP | 2008-178215 A | 7/2008 |
| TW | 200849770 A | 12/2008 |

OTHER PUBLICATIONS

Chenier, Glen. Reversal of Fortune. Electronic, Design, Strategy, News. 2009. p. 62.
Cha et al. "A New Soft Switching Direct Converter for Residential Fuel Cell Power System", IAS 2004. 2:1172-1177.
Choe et al. "A Parallel Operation Algorithm with Power-Sharing Technique for FC Generation Systems". 2009.725-731.

* cited by examiner

METHOD AND APPARATUS FOR DELIVERING POWER USING EXTERNAL DATA

CROSS-REFERENCE TO RELATED APPLICATIONS

This application claims the benefit of U.S. Provisional Patent Application Ser. No. 61/683,113, filed Aug. 14, 2012, U.S. Provisional Patent Application Ser. No. 61/693,684, filed Aug. 27, 2012 and U.S. Provisional Patent Application Ser. No. 61/801,274, filed Mar. 15, 2013, which are all herein incorporated by reference.

BACKGROUND OF THE INVENTION

1. Field of the Invention

Embodiments of the present invention generally relate to a method and an apparatus for controlling fluctuations in power and amount of power used at an electric load location and/or on an electrical grid.

2. Description of the Related Art

Energy demand at a commercial site, such as a business, or at home will vary over the time of day. In a typical home or hotel setting, there is a peak in the morning when the occupants get up and when the occupants return home at the end of the day. This typically creates two demand peaks during a normal day. Commercial buildings tend to follow different patterns depending on the nature of the business. For example, usage is typically low when a commercial building is closed, and may be relatively constant or fluctuate between moderate to high levels depending on the type of business when the building is open. For example, a car wash may have more fluctuations in its energy use than an office building in a moderate climate.

The cost to a utility for generating or purchasing electrical energy increases dramatically during periods of peak use versus periods of off-peak usage. In order to compensate for the higher peak-hours costs, utility companies often employ time of day-based rate schedules, charging a significantly higher rate for electrical energy (e.g., cost per kilowatt-hour (kW-hr)) consumed during peak usage hours as compared to energy consumed during off-peak hours. For example, homes and businesses may pay for electricity on a per-kilowatt hour basis with one rate applying during off-peak hours, and another, higher, rate applying during peak hours. The higher rates charged during peak usage periods can lead to significantly higher energy costs for the user, especially when the user's period(s) of high demand coincides with or falls within the interval set by the utility as peak hours.

Devices have been developed that help users reduce the cost of electricity purchases from the power grid by storing electricity in energy storage mediums, such as batteries, that can be "drawn down" during peak hours to reduce demand from the grid. The batteries can be charged during non-peak hours, thus reducing the total cost of electricity, and, during favorable conditions, electricity can even be sold back to the grid. This process is often referred to as "energy arbitrage," which is generally the storing of energy at one time of day and then the discharging of energy at another time, effectively shifting energy consumption from one time period to another.

Energy storage mediums, especially battery energy storage, are expensive and, while various techniques are known by which an energy storage system can be used to optimize energy use at a business or home, such techniques are generally inefficient in applying stored energy to effectively control the energy use at an electric load location. Consequently, an impractical quantity of energy storage mediums are required at an electric load location to realize useful energy arbitrage. Generally, such energy storage systems use simple methods for controlling the charging and discharging of power provided to offset peak demands. For example, two approaches commonly used in energy storage systems include: Using a simple timer to control charge times of the energy storage system (typically during off-peak hours) and discharge times (typically during peak demand hours); and using a single demand set-point that the storage system reacts to while monitoring and controlling the energy use of the business or home location. A single demand set-point generally is a single level set-point to which the controlling element in an energy storage system will control during operation. Each of these approaches generally requires an uneconomical amount of energy storage capacity in order to offset demand peaks at the electric load location. Furthermore, use of a single demand set-point typically results in an energy storage system running out of energy storage availability due to over-reaction of the controlling components to the demand set point set by the controlling system. Thus, a need exists for power charge and discharge systems and methods that more effectively utilize the consumable energy storage medium components in an energy storage system.

Moreover, today's electric grid is undersupplied and over-demanded at critical points during the day, while at other times is oversupplied and under-demanded. With an increase in variable renewable generation (e.g., wind and solar) and a decrease in the number of traditional generators, it is becoming more and more difficult for utilities and grid operators to reliably manage their transmission and distribution grids. Thus, there is also a need for power charge and discharge systems and methods that can help control and limit the fluctuations in power seen on the electrical grid.

SUMMARY OF THE INVENTION

Embodiments of the present invention include control methods employed in distributed energy storage systems that are located behind utility meters typically located at, but not limited to, medium and large commercial and industrial locations. According to such control methods, these distributed energy storage systems operate semi-autonomously, but may be in frequent contact with a cloud-based optimization engine that is configured to develop energy control solutions based on various data inputs and to communicate these energy control solutions to one or more of the distributed energy storage systems. One of the goals of an installed distributed energy storage system is to monitor the location's electric load and electricity use, and discharge at times of high demand peaks in order to reduce the peak power provided by the electric grid, while maximizing the finite amount of energy stored in the consumable energy storage components in the distributed energy storage system. To perform this task the distributed energy storage system may control the kilowatt demand of the local electric load location by controlling the control set-point over time by discharging energy storage devices, such as DC batteries, through a bidirectional energy converter.

Embodiments of the invention may further provide a system for controlling the transfer of energy between an electric load location and an electric grid comprises a power monitor, an optimization engine, and a system controller. The power monitor is configured to monitor electric power usage at a point of common coupling with an electric meter and an electric load at a common location, wherein the electric meter is configured to measure power transferred to the electric load location through the electric line. The optimization engine is configured to receive one or more external inputs and create a set of operating parameters based on the one or more external inputs. The system controller is configured to receive the created operating parameters and use the operating parameters to control an amount of energy flowing through the electric line below a threshold value.

Embodiments of the invention may further provide a system for controlling energy transferred between an electric grid and an electric load location comprises an optimization engine and a distributed energy storage device. The optimization engine is configured to receive one or more external inputs and create one or more operating control curves based on the one or more external inputs. The distributed energy storage device comprises a system controller and a power monitor that is configured to monitor an electric line that is coupled to an electric meter, wherein the system controller is configured to receive the one or more operating control curves, compare the one or more operating control curves to information received from the power monitor, and control a transfer of energy from or to the electric line from an energy storage device based on the computation.

Embodiments of the invention may further provide a method of controlling energy transferred between an electric grid and an electric load location comprises monitoring a first rate of energy transfer from an electric line to the electric load location, wherein the electric line is coupled to an electric meter adapted to determine power transferred between the electric load location and the electric grid, receiving a first set of operating parameters that are created based on one or more received external inputs and, based on the first set of operating parameters, varying the energy transfer from an energy storage device to the electric line to cause the first rate of energy transfer to remain below a threshold value, wherein the threshold value varies with time.

Embodiments of the invention may further provide a method of controlling fluctuations in energy use at an electric load location, comprises generating control parameters based on a simulation that is performed using forecast information, monitoring a first rate of energy transfer from an electric line to an electric load location, and controlling a second rate of energy transfer between the electric line and an energy storage device based on the control parameters, wherein controlling the second rate of energy transfer alters the first rate of energy transfer.

Embodiments of the invention may further provide a method of controlling fluctuations in the energy use at an electric load location comprises monitoring power fluctuations in an electric line that is coupled to an electric load location, and controlling a transfer of energy from or to the electric line from an energy source, wherein controlling the transfer of energy is adapted to control the amount of variation in time of power delivered through the electric line. In such an embodiment, controlling the transfer of energy comprises controlling the transfer of energy to a first set-point and then controlling the transfer of energy to a second set-point, wherein the second set-point is selected based on a change in electrical pricing information.

Embodiments of the invention may further provide a system for controlling energy transferred between an electric grid and an electric load location comprises an energy source, a power monitor, a bi-directional power converter, and a system controller. The power monitor is configured to monitor an electric line that is coupled to an electric meter of an electric load location, wherein the electric meter is used by a utility to determine power delivered to one or more electrical components disposed in the electric load location through the electric line. The bi-directional power converter electrically coupled to the energy source and the electric line. The system controller that is configured to control a transfer of energy between the energy source and the electric line using the bi-directional power converter.

Embodiments of the invention may further provide a computer readable medium is configured to store instructions executable by a processor of a host device, the instructions when executed by the processor causing the processor to generate control parameters based on a simulation that is performed using forecast information, monitor power fluctuations in an electric line that is coupled to an electric load location, and control a transfer of energy from or to the electric line from an energy source based on the control parameters, wherein controlling the transfer of energy is adapted to control the amount of variation in time of power delivered through the electric line.

Embodiments of the invention may further provide a computer readable medium is configured to store instructions executable by a processor of a host device, the instructions when executed by the processor causing the processor to create a list of control coefficients, validate the list of created control coefficients, create a forecast for a first time period for each of the listed control coefficients based on one or more received external inputs, generate control parameters based on a simulation that is performed using the information generated from the forecast, monitor power fluctuations in an electric line that is coupled to an electric load location, and control a transfer of energy from or to the electric line from an energy source based on the control parameters, wherein controlling the transfer of energy is adapted to control the amount of variation in time of power delivered through the electric line.

Embodiments of the invention may further provide a computer readable medium is configured to store instructions executable by a processor of a host device, the instructions when executed by the processor causing the processor to: monitor power fluctuations in an electric line that is coupled to an electric meter of an electric load location, wherein the electric meter is adapted to determine power delivered to one or more electrical components disposed in the electric load location, create one or more first feedback based operating control curves based on one or more received external inputs, and control a transfer of energy from or to the electric line from an energy source based on a comparison of the created one or more first feedback based operating control curves and the monitored power fluctuations, wherein controlling the transfer of energy is adapted to control the amount of variation in time of power delivered through the electric line and measured by the electric meter.

Embodiments of the invention may further provide a computer readable medium is configured to store instructions executable by a processor of a host device, the instructions when executed by the processor causing the processor to, monitor power fluctuations in an electric line that is coupled to an electric meter of an electric load location, wherein the electric meter is adapted to determine power delivered to one or more electrical components disposed in the electric load location, create a first set of operating parameters based on one or more received external inputs, and control a transfer of energy from or to the electric line from an energy source based on the first set of operating parameters, wherein controlling the transfer of energy is adapted to control the amount of variation in time of power delivered through the electric line and measured by the electric meter.

Embodiments of the invention may further provide a system for managing energy use of an electric load location, comprising a power monitor, an optimization engine, and a system controller. The power monitor is configured to monitor an electric line that is coupled to an electric meter of an electric load location, wherein the electric meter is used by a utility to determine the cost of power delivered to one or more electrical components disposed in the electric load location through the electric line. The optimization engine is configured to receive one or more external inputs and create a set of operating parameters based on the one or more external inputs. The system controller is configured to receive the created operating parameters and use the operating parameters to control a transfer of energy between the electric line and an energy source to adjust variations in time of energy delivered through the electric line to the electric meter. In some embodiments, the system controller may be further configured to create storage system results and provide the storage system results to the optimization engine, the energy source may comprise one or more batteries, and/or the system controller may comprise a set-point controller and a runtime controller. In some embodiments, the one or more external inputs may be selected from a group consisting of weather information, sunrise and sunset information, power usage rates, utility's billing period, geographic location, local solar production, local incident light, customer type, building specifics (e.g., material, square footage, age and type of equipment), grid operator data (e.g., locational marginal price, area control error, automatic generation control), and time (e.g., time of day) data. In some embodiments, the system controller may be in communication with the optimization engine, and configured to transmit information used to adjust the variation in time of power delivered through the electric line to the optimization engine to improve subsequently created operating parameters.

Embodiments of the invention may further provide a method of controlling fluctuations in energy use of an electric load location in order to maintain a predetermined electric demand comprises monitoring power fluctuations in an electric line that is coupled to an electric meter of an electric load location, wherein the electric meter is adapted to determine the cost of power delivered to one or more electrical components disposed in the electric load location, creating a first set of operating parameters based on one or more received external inputs, and controlling a transfer of energy between the electric line and an energy source based on the first set of operating parameters, wherein controlling the transfer of energy is adapted to control the amount of variation in time of energy delivered through the electric line and measured by the electric meter. In some embodiments, the energy source comprises one or more batteries. In some embodiments, the one or more external inputs may be selected from a group consisting of current and future weather information, sunrise and sunset information, utility rate and billing period, geographic location, local solar production, local incident light, customer type, building specifics (e.g., material, square footage, age and type of equipment), grid operator data (e.g., locational marginal price, area control error, automatic generation control), and time (e.g., time of day) data. In some embodiments, the method further comprises transmitting information used to control the variation in time of power delivered through the electric line to the optimization engine, creating a second set of operating parameters based on the transmitted information, and controlling a transfer of energy from or to the electric line from the energy source based on the second set of operating parameters.

Embodiments of the invention may further provide a system for managing energy use of an electric load location comprises an optimization engine and a distributed energy storage device. The optimization engine is configured to receive one or more external inputs and create one or more operating control curves based on the one or more external inputs. The distributed energy storage device comprises a system controller and a power monitor that is configured to monitor power usage at a point of common coupling with an electric meter and an electric load at a common location, wherein the system controller that is configured to receive the one or more operating control curves and compare the one or more operating control curves to information received from the power monitor and control a transfer of energy from or to the electric line from an energy source based on information received from the comparison. In some embodiments, the utility electric meter is used by a utility to determine the cost of power delivered to one or more electrical components disposed in the electric load location through the electric line, and in some embodiments the one or more operating control curves are selected from a group consisting of a battery state of charge curve and a discrete or a continuous demand setpoint curve.

Embodiments of the invention may further provide a method of controlling fluctuations in energy use of an electric load location comprises monitoring power fluctuations in an electric line that is coupled to an electric meter of an electric load location, wherein the electric meter is adapted to determine the cost of power delivered to one or more electrical components disposed in the electric load location, creating one or more first feedback based operating control curves based on one or more received external inputs, and controlling a transfer of energy between the electric line and an energy source based on a comparison of the created one or more first feedback based operating control curves and the monitored power fluctuations, wherein controlling the transfer of energy is adapted to control the amount of variation in time of energy delivered through the electric line and measured by the electric meter. In some embodiments, the method further comprises creating one or more default curves, wherein controlling the transfer of energy from or to the electric line further comprises comparing the one or more first feedback based operating control curves or one or more default curves and monitored power fluctuations in the electric line to control the variation in time of energy delivered through the electric line. In some embodiments, the method further comprises creating one or more second feedback based operating control curves based on one or more received external inputs, wherein controlling the transfer of energy from or to the electric line further comprises controlling the transfer of energy from or to the electric line based on a comparison of the one or more second feedback based operating control curves and the monitored power fluctuations. In some embodiments, the method further comprises creating one or more default curves and creating one or more second feedback based operating control curves based on one or more received external inputs, wherein controlling the transfer of energy from or to the electric line further comprises controlling the transfer of energy from or to the electric line based on a comparison of the monitored power fluctuations and either the one or more first feedback based operating control curves, the one or more second feedback based operating control curves or the default curves. In some embodiments, controlling the transfer of energy from or to the electric line further comprises creating a plurality of one or more feedback based operating control curves at a first time interval, transferring the plurality of one or more feedback based operating control curves to an energy storage system controller at a second time interval, and controlling the transfer of energy from or to the electric line by comparing each of the plurality of one or more feedback based operating control curves and the monitored power fluctuations in the electric line to control the variation in time of energy delivered through the electric line. In such embodiment, the method may further comprise creating one or more default curves, wherein controlling the transfer of energy from or to the electric line further comprises comparing the default curves and the monitored power fluctuations in the electric line when at least one of the plurality of one or more feedback based operating control curves is not received by the energy storage system controller.

Embodiments of the invention may further provide a method of controlling fluctuations in energy use at an electric load location comprises creating a list of control coefficients, validating the list of created control coefficients, creating a forecast for a first time period for each of the listed control coefficients based on one or more received external inputs, generating control parameters based on a simulation that is performed using the information generated from the forecast, monitoring power fluctuations in an electric line that is coupled to an electric load location, and controlling a transfer of energy between the electric line and an energy source based on the control parameters, wherein controlling the transfer of energy is adapted to control the amount of variation in time of energy delivered through the electric line. In some embodiments, validating the list of coefficients comprises performing a simulation using the created control coefficients. In some embodiments, the forecast is based on received forecasted coefficient data and received historical coefficient data. In some embodiments, the method further comprises cleansing the one or more received external inputs by adjusting the information received from a first external input so that the time scale matches information received from a second external input. In some embodiments the control parameters comprise optimum set-points as a function of time and one or more battery curves, and in some such embodiments, the one or more battery curves comprise a set of time-based battery state of charge curves. In some embodiments, the coefficients are created from information selected from a group consisting of weather information, sunrise and sunset information, power usage rates, utility's billing period, geographic location, local solar production, local incident light, customer type, building specifics, grid operator data, and time of day data. In some embodiments, generating the control parameters comprises receiving electrical power tariff information for the first time period, and generating the control parameters based on the electrical power tariff information. In some embodiments, generating the control parameters comprises performing a simulation that contains the electrical power tariff information. In some embodiments, generating the control parameters comprises receiving electrical power tariff information for the first time period, receiving device operation information, and generating the control parameters based on a simulation that contains the electrical power tariff information. In such embodiments, the device operation information comprises at least one of the following: state-of-charge information received from the energy source; total charge capacity information received from the energy source; charge discharge efficiency rating information received from the energy source; or current energy capacity information received from the energy source.

Embodiments of the invention may further provide a method of controlling fluctuations in the energy use at an electric load location, comprises generating control parameters based on a simulation that is performed using forecast information, monitoring power fluctuations in an electric line that is coupled to an electric load location, and controlling a transfer of energy between the electric line and an energy source based on the control parameters, wherein controlling the transfer of energy is adapted to control the amount of variation in time of energy delivered through the electric line. In some embodiments, the forecast information is based on received forecasted coefficient data and received historical coefficient data. In some embodiments, the forecasted coefficient data is created from information selected from a group consisting of current and future weather information, sunrise and sunset information, utility rate and billing period, geographic location, local solar production, local incident light, customer type, building specifics, grid operator data, and time of day data. In some embodiments, generating control parameters further comprises creating a forecast for a first time period based on one or more received external inputs, and cleansing the one or more received external inputs by adjusting the information received from a first external input so that the time scale matches information received from a second external input. In some embodiments, the control parameters comprise at least one of an optimum set-points as a function of time, or one or more battery curves. In such embodiments, the one or more battery curves may comprise a set of time-based battery state of charge curves, and the one or more battery curves may comprise a flat battery curve, a stepped battery curve or a forecasted battery curve. In some embodiments, generating the control parameters comprises receiving electrical power tariff information for the first time period, and generating the control parameters based on the electrical power tariff information. In such embodiments, generating the control parameters may comprise performing a simulation that contains the electrical power tariff information. Also in such embodiments, generating the control parameters may comprise receiving electrical power tariff information for the first time period, receiving device operation information, and generating the control parameters based on a simulation that contains the electrical power tariff information, wherein the device operation information comprises at least one of the following: state-of-charge information received from the energy source; total charge capacity information received from the energy source; charge discharge efficiency rating information received from the energy source; or current energy capacity information received from the energy source. In some embodiments, generating the control parameters comprises performing a simulation that contains electrical power tariff information.

Embodiments of the invention may further provide a method of controlling fluctuations in the energy use at an electric load location comprises monitoring power fluctuations in an electric line that is coupled to an electric load location and controlling a transfer of energy from or to the electric line from an energy source, wherein controlling the transfer of energy is adapted to control the amount of variation in time of power delivered through the electric line, wherein controlling the transfer of energy comprises controlling the transfer of energy to a first set-point, and then controlling the transfer of energy to a second set-point, wherein the second set-point is selected based on a change in the electrical tariff. In some embodiments, the selection of the second set-point is based on a simulation that contains the electrical power tariff information and/or the selection of the second set-point is based on state-of-charge data received from the energy source. In some embodiments, the selection of the second set-point comprises receiving forecast information that is derived from forecasted coefficient data or historical coefficient data.

Embodiments of the invention may further provide a system for managing energy use of an electric load location comprises an energy source, a power monitor that is configured to monitor electric power usage at a point of common coupling with an electric meter and an electric load at a common location, wherein the electric meter is used by a utility to determine the cost of power delivered to one or more electrical components disposed in the electric load location through the electric line, a bi-directional power converter electrically coupled to the energy source and the electric line, and a system controller that is configured to control a transfer of energy between the energy source and the electric line using the bi-directional power converter. In some embodiments, the system further comprises an optimization engine configured to receive one or more external inputs and create a set of operating parameters based on the one or more external inputs, and the system controller is configured to receive the created operating parameters and use the operating parameters to control the transfer of energy between the energy source and the electric line using the bi-directional power converter. In such embodiment, the system controller may be in communication with the optimization engine, and may be configured to transmit information used to adjust the variation in time of power delivered through the electric line to the optimization engine to improve subsequently created operating parameters. Also in such embodiments, the system controller may be further configured to create storage system results and provide the storage system results to the optimization engine. Also in such embodiments, the one or more external inputs are selected from a group consisting of current and future weather information, sunrise and sunset information, utility rate and billing period, geographic location, local solar production, local incident light, customer type, building specifics (e.g., material, square footage, age and type of equipment), grid operator data (e.g., locational marginal price, area control error, automatic generation control), and time (e.g., time of day) data. In some embodiments, wherein the energy source comprises one or more batteries, and in some embodiments, the system controller comprises a set-point controller and a runtime controller.

Embodiments of the invention may further provide a system for managing energy use of an electric load location comprises a power monitor, an optimization engine, and a system controller. The power monitor is configured to monitor an electric line that is coupled to an electric meter of an electric load location, wherein the electric meter is used by a utility to determine the cost of power delivered to one or more electrical components disposed in the electric load location through the electric line. The optimization engine is configured to receive one or more external inputs and create a set of operating parameters based on the one or more external inputs. The system controller is configured to receive the created operating parameters and use the operating parameters to control a transfer of energy from or to the electric line from an energy source to adjust variations in time of power delivered through the electric line to the electric meter, wherein the system controller comprises a computer readable medium that is configured to store instructions used by a plurality of software-based controllers that includes a solution manager, a set-point controller, a runtime controller, and an offset controller.

Embodiments of the invention may further provide a non-transitory computer readable medium is configured to store instructions executable by a processor of a host device, the instructions when executed by the processor causing the processor to generate control parameters based on a simulation that is performed using forecast information, monitor power fluctuations in an electric line that is coupled to an electric load location, and control a transfer of energy from or to the electric line from an energy source based on the control parameters, wherein controlling the transfer of energy is adapted to control the amount of variation in time of power delivered through the electric line.

Embodiments of the invention may further provide a non-transitory computer readable medium is configured to store instructions executable by a processor of a host device, the instructions when executed by the processor causing the processor to create a list of control coefficients, validate the list of created control coefficients create a forecast for a first time period for each of the listed control coefficients based on one or more received external inputs, generate control parameters based on a simulation that is performed using the information generated from the forecast, monitor power fluctuations in an electric line that is coupled to an electric load location, and control a transfer of energy from or to the electric line from an energy source based on the control parameters, wherein controlling the transfer of energy is adapted to control the amount of variation in time of power delivered through the electric line.

Embodiments of the invention may further provide a non-transitory computer readable medium is configured to store instructions executable by a processor of a host device, the instructions when executed by the processor causing the processor to monitor power fluctuations in an electric line that is coupled to an electric meter of an electric load location, wherein the electric meter is adapted to determine the cost of power delivered to one or more electrical components disposed in the electric load location, create one or more first feedback based operating control curves based on one or more received external inputs, and control a transfer of energy from or to the electric line from an energy source based on a comparison of the created one or more first feedback based operating control curves and the monitored power fluctuations, wherein controlling the transfer of energy is adapted to control the amount of variation in time of power delivered through the electric line and measured by the electric meter.

Embodiments of the invention may further provide a system for managing energy use of an electric load location that comprises an optimization engine and a distributed energy storage system. The optimization engine is configured to receive one or more external inputs and create a set of operating parameters based on the one or more external inputs wherein the system controller comprises a non-transitory computer readable medium that is configured to store instructions used by a plurality of software-based controllers that includes at least one of the following: a coefficient engine, a forecast engine, a simulation engine, a solution engine, a universal tariff engine, and a risk management engine. The distributed energy storage system comprises an energy source, a power monitor configured to monitor electric power usage at a point of common coupling with an electric meter and an electric load at a common location, wherein the electric meter is used by a utility to determine the cost of power delivered to one or more electrical components disposed in the electric load location through the electric line, a bi-directional power converter electrically coupled to the energy source and the electric line, and a system controller. The system controller is configured to receive the created operating parameters and use the operating parameters to control a transfer of energy from or to the electric line from an energy source to adjust variations in time of power delivered through the electric line to the electric meter, wherein the system controller comprises a computer readable medium that is configured to store instructions used by a plurality of software-based controllers that includes at least one of the following: a solution manager, a set-point controller, a runtime controller, and an offset controller.

Embodiments of the invention may further provide a non-transitory computer readable medium is configured to store instructions executable by a processor of a host device, the instructions when executed by the processor causing the processor to monitor power fluctuations in an electric line that is coupled to an electric meter of an electric load location, wherein the electric meter is adapted to determine the cost of power delivered to one or more electrical components disposed in the electric load location, create a first set of operating parameters based on one or more received external inputs, and control a transfer of energy from or to the electric line from an energy source based on the first set of operating parameters, wherein controlling the transfer of energy is adapted to control the amount of variation in time of power delivered through the electric line and measured by the electric meter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
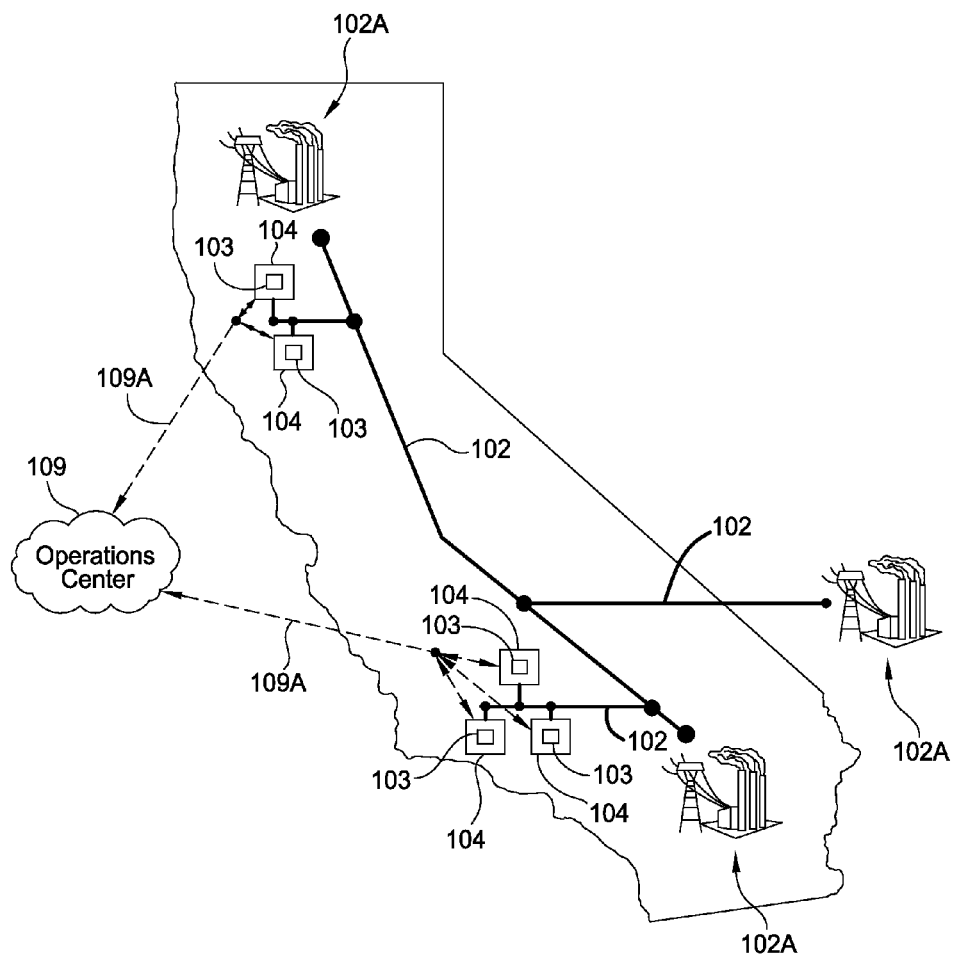
FIG. 1 illustrates a plurality of distributed energy storage systems that are each positioned at an electric load location that is coupled to an electrical grid, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present invention relate to distributed energy storage systems installed either behind a utility's electric meter at electric load locations, such as commercial electric load locations, residential sites and/or commercial solar/wind production sites. The term commercial electric load location as used herein, generally includes a broad range of commercial and industrial electric users, such as hotels, office buildings, and restaurants, or installed on utility controlled sites including but not limited to substations, distribution or transmission lines, and capacitor banks. These distributed energy storage systems monitor the location's electricity use, and discharge at times of high demand peaks in order to reduce the peak power provided by the electric grid, while maximizing the finite amount of energy stored in the consumable energy storage components in the distributed energy storage system. These systems recharge at times of low demand and/or low electricity rates. From the utility's perspective, demand spike reduction is more valuable than the act of consuming additional energy during periods of lower demand. Some of the benefits of using the distributed energy storage systems described herein are: reduce the total energy cost to the customer (by primarily reducing peak demand charges); help the make the wider electric grid cleaner and more efficient by reducing overall peak power demand which typically requires more expensive and dirtier generation to meet the electric grid's power generation needs; and maximize the usable lifetime of the consumable energy storage components in the distributed energy storage system, and thus reduce the cost-of-ownership of the distributed energy storage system.

FIG. 1 illustrates a plurality of distributed energy storage systems 103 that are each positioned at an electric load location 104 that is coupled to an electrical grid 102, according to one embodiment of the invention. The electrical grid 102 will generally be connected to one or more electric load locations 104 and one or more power plants 102A that are adapted to deliver electric power to the electric grid 102. In general, an electric utility will help provide and/or deliver power to each of the electric load locations 104 in a region of the electric grid 102. In some cases, the tariff structure, such as electric rates and billing schedules, for different electric utilities may vary from region to region within the electric grid 102. The distributed energy storage systems 103, also referred to as advanced energy systems (AESs), are coupled to the electric grid 102. Consequently, the distributed energy storage systems 103 may be in communication with other distributed energy storage systems 103 distributed along the electric grid 102 and may be in communication with an operations center 109. The operations center 109 may include software and hardware components that are configured to store, retrieve operation information from, and transmit operation information to each distributed energy storage system 103 to control the power fluctuations and power delivery at each respective electric load location 104. In some cases, the operation information may include environmental data, control set point information, device commands and other useful information. Distributed energy storage systems 103 in the different regions of the grid are generally able to account for differences in power pricing (including energy tariffs and real-time energy pricing), differences in weather, differences in the health of the electric grid, and other external and internal electric power usage differences to provide an optimized and/or customized control of the power at each electric load location 104.

Figure 2A:
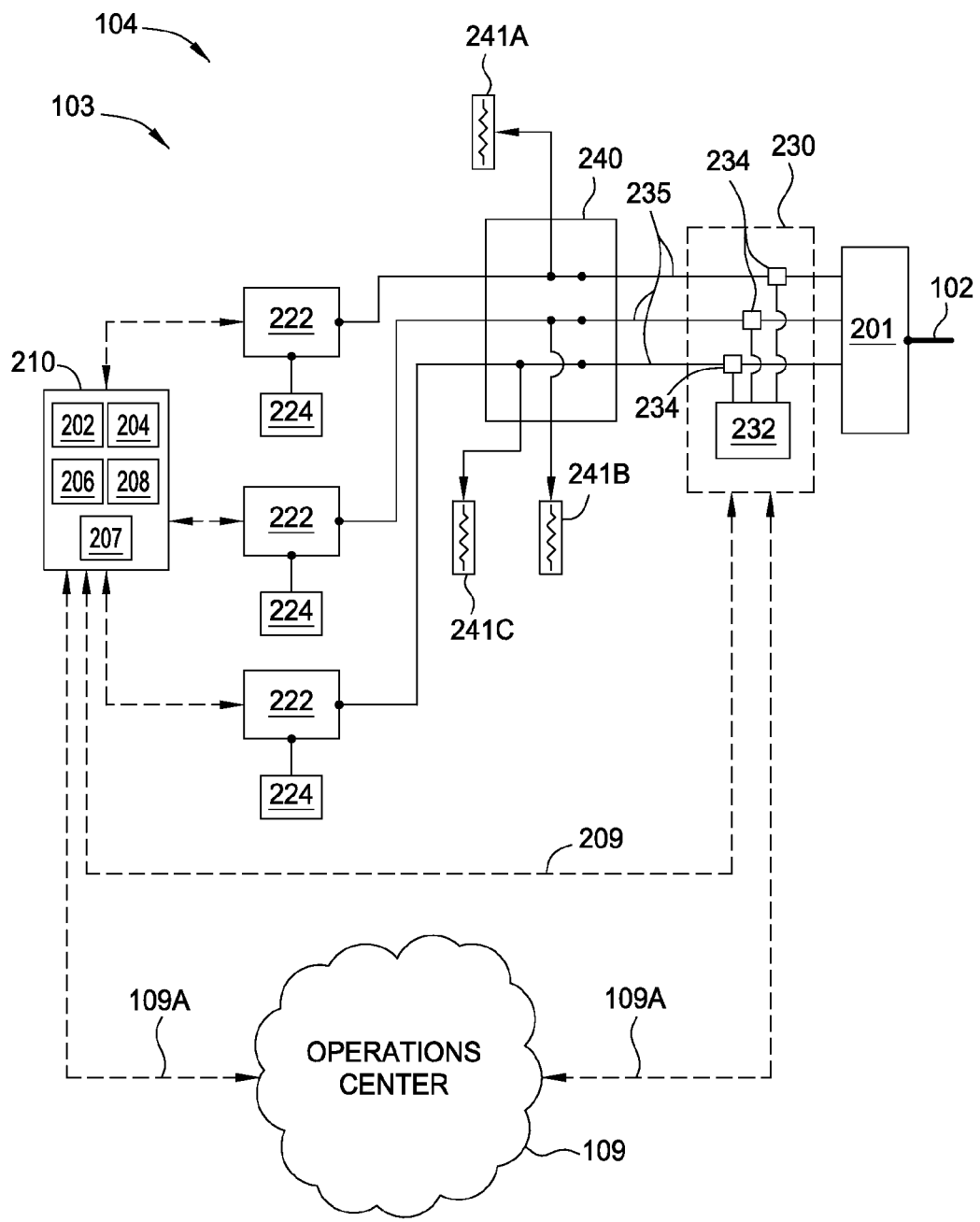
FIG. 2A schematically illustrates one embodiment of a distributed energy storage system that is disposed at an electric load location, according to one embodiment of the invention.

Embodiments of the invention use a control method employed in the distributed energy storage systems 103 located behind a utility's electric meter 201 (FIGS. 2A-2C) typically located at, but not limited to, medium and large commercial and industrial locations. FIG. 2A schematically illustrates one embodiment of a distributed energy storage system 103 that is disposed at an electric load location 104. The distributed energy storage system 103 may include a power monitor 230, one or more power controllers 222, which are coupled to an energy source 224, and a system controller 210. The electric load location 104 typically contains an electric meter 201 that is coupled to the electric grid 102 and is used by the utility to track electricity usage at the electric load location 104. The electric meter 201 is configured to provide power to one or more electric loads that are connected to a breaker panel 240 (e.g., three electric loads 241A-241C are shown in FIG. 2A).

In one example, the electric meter 201 is configured to distribute power to the electric loads 241A-241C along one or more phases that are each coupled to the breaker panel 240 along a conducting element 235. In general, an electric load can be any device that uses electrical energy at an electric load location 104, and may include, for example, heating, ventilation, air conditioning (HVAC) equipment, lighting, and other electronics units that receive power from the electric grid 102. Each electric load 241A-241C may separately draw power through each conducting element 235. The amount of power passing through the conducting element 235 is monitored by a sensor 234 disposed in the power monitor 230. The power monitor 230 will typically include one or more sensors 234 (e.g., voltage sensor and/or current sensor) that are configured to monitor and deliver a signal to a power monitor controller 232 that is configured to process and deliver data relating to the time varying current (A), voltage (V) and/or power (W) delivered on the one or more phases to the system controller 210, and in some cases time varying current, voltage and/or power data to the operations center 109.

To control fluctuation in power and/or power level being drawn by each of the electric loads 241A-241C in an electric load location 104, the distributed energy storage system 103 typically includes one or more power controllers 222 that are configured to control the delivery of power to the electric grid 102 or absorption of power received from the electric grid 102 by use of a connected energy source 224. In one embodiment, the power controllers 222 include one or more bidirectional power converters 225 (shown in FIGS. 2B and 2C) that are capable of quickly converting stored DC energy found in the energy source 224 to the grid AC electricity and grid AC electricity back to DC energy that is stored in the energy source 224. An example of a bidirectional power converter that may be adapted for use with the distributed energy storage systems disclosed herein is further described in the commonly assigned U.S. patent application Ser. No. 12/731,070, which was filed Mar. 24, 2010, which is herein incorporated by reference.

The distributed energy storage systems 103 can operate autonomously, but generally may be in frequent contact with a cloud-based optimization engine that may be located in the operations center 109. The optimization engine 1031, which is discussed further below, can take in various data inputs and develop optimal energy control solutions which are passed back down to one or more of the distributed energy storage systems 103. In most cases, the primary goal of the installed distributed energy storage system 103 is to keep kilowatt demand of the electric load location 104 from exceeding certain set-point(s), which may be altered at different times of the day. Simply, this occurs by discharging the energy stored in the energy source 224, such as energy storage devices that may include DC batteries, through the bidirectional energy converter 225 during peak demand events. In some embodiments, the distributed energy storage systems 103 also manage the battery state-of-charge by recharging energy source 224 during periods of lower demand. The state-of-charge represents the amount of energy stored in the storage medium of energy source 224 (e.g., batteries), which can be converted to electrical energy at any time of day, for example during a peak demand event. The distributed energy storage system 103 is generally intelligent enough to ensure that there is adequate energy stored in the energy source 224 to be able to offset at least a portion of high-demand events. Also, the controlling elements (e.g., system controller 210) in the energy storage system 103 can be used to prevent the unwanted exhaustion of the stored energy in the energy source 224 during non-high demand times, due to an unscheduled or unforeseen demand during these non-critical and low energy cost times. Thus, employing a control system that is based on predictive data can reduce total energy cost to the customer and/or to help make the wider electric grid cleaner. Therefore, energy storage systems that can predict the occurrence of peak demand events allow the energy storage system to better manage the state-of-charge of the energy storage medium in the energy source 224, and maximize the amount of time that the energy storage components are available to be used to reduce demand spikes during a day, and especially demand spikes during times of high cost and high-demand on the grid.

The system controller 210 typically includes a central processing unit (CPU) (not shown), memory (not shown), and support circuits (or I/O) (not shown). The CPU may be one of any form of computer processor that is used for controlling various system functions and support hardware and monitoring the processes being controlled by and within the distributed energy storage systems 103. The memory is coupled to the CPU, and may be one or more of a readily available memory, such as random access memory (RAM), read only memory (ROM), floppy disk, hard disk, or any other form of digital storage, local or remote. Software instructions (or computer instructions) and data may be coded and stored within the memory for instructing the CPU. The software instructions may include a program that determines which tasks are to be performed at any instant in time. The support circuits are also connected to the CPU for supporting the processor in a conventional manner. The support circuits may include cache, power supplies, clock circuits, input/output circuitry, subsystems, and the like. The system controller 210 is configured to receive information from and deliver control commands to the source power controller 223 found in the one or more power controllers 222 via a wired or wireless communication link 223A. The system controller 210 is also configured to receive information from the power monitor 230 via a wired or wireless link 209 and from the operations center 109 via a wired or wireless link 109A.

In one embodiment, the system controller 210 also includes a plurality of software based controlling elements that are adapted to synchronize and control the transfer of power between the conducting element 235 that is coupled to the electric grid 102 based on computer instructions retained in the memory of the system controller 210. The software based controlling elements found in the system controller 210 include a solution manager 202, a set point controller 204, and a run time controller 206. In some embodiments, the software based controlling elements may also include an optional offset controller 208 and/or an local power controller 207.

Figure 2B:
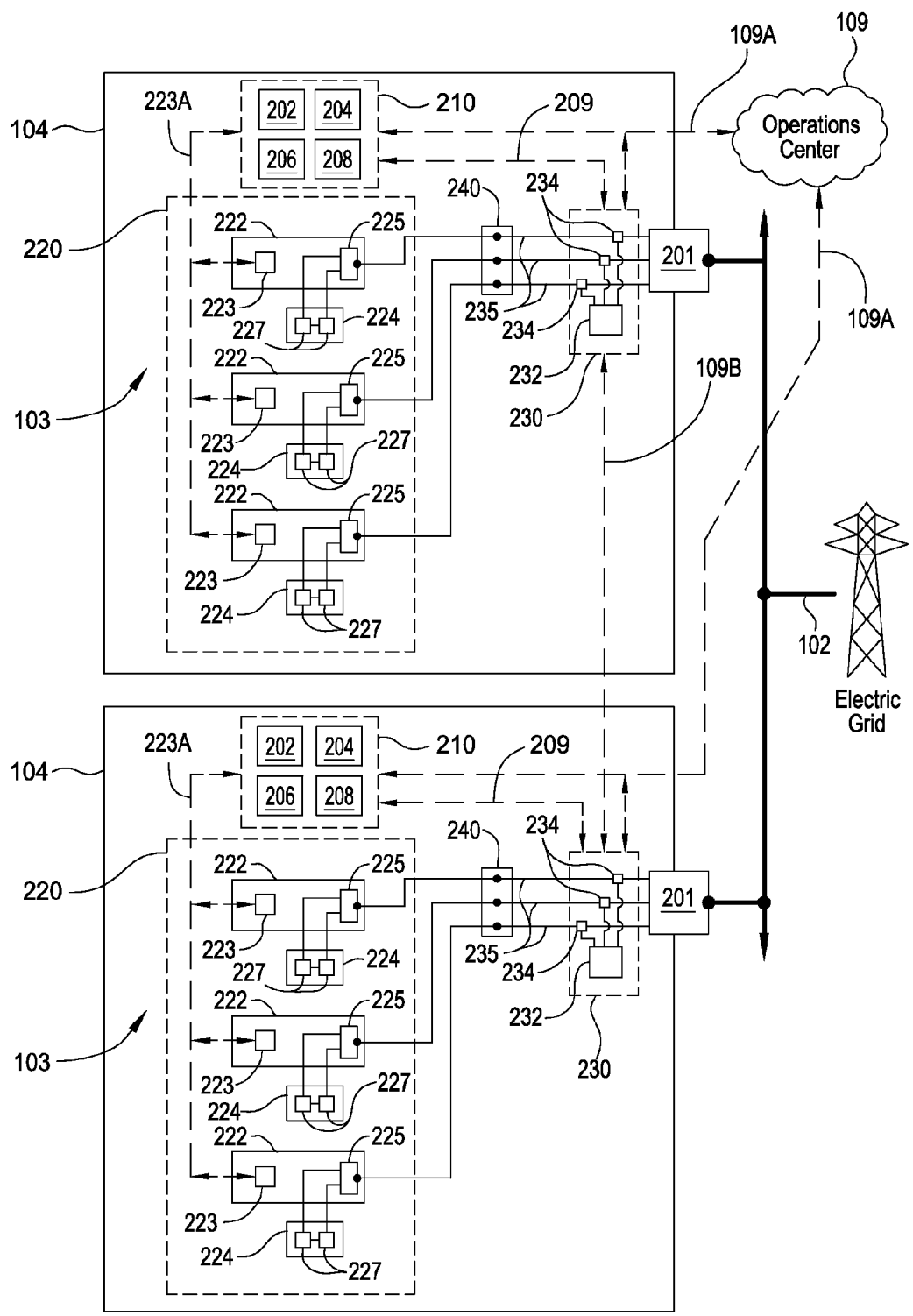
FIG. 2B schematically illustrates two electric load locations that are each coupled to the electric grid through an electric grid and include a distributed energy storage system, according to one embodiment of the invention.

FIG. 2B schematically illustrates two electric load locations 104 that are each coupled to the electric grid 102 through an electric meter 201 and include a distributed energy storage system 103. In this example, each of the distributed energy storage systems 103 are in communication with each other through a link 109B. In one embodiment, the link 109B is created using wired or wireless communication components found in the power monitor controller 232, so that the control between electric load locations 104 can be coordinated. For clarity, the electric loads 241A-241C are not show in the distributed energy storage systems 103 of FIG. 2B.

In one embodiment, as illustrated in FIG. 2B, the distributed energy storage systems 103 each include one or more power controllers 222 that are coupled to an energy source 224 and include a source power controller 223 and a bidirectional energy converter 225. The energy source 224 may include one or more batteries 227 that may be coupled in series, so as to provide a desirable output voltage (Volts) to the bidirectional energy converter 225 and provide a desirable storage capacity (Amp-hrs). The bidirectional power converter 225 may include one or more software and/or hardware components (e.g., bridge rectifiers, power transistors, transformers, resistors, capacitors, diodes) that are capable of controlling the delivery and absorption of power from the electric grid 102. In some embodiments, the bidirectional power converter 225 may include components that are able to separately deliver power to or receive power from a conducting element 235 that is connected to a phase that is coupled to the electric grid 102. In such embodiments, the energy source 224 may include a plurality of separate battery arrays (not shown) that are each coupled to a separate power controlling circuit in the bidirectional power converter 225 to control the efficient transfer of power at a desirable rate between the conducting element 235 and energy source 224. Such battery arrays may include two or more batteries 227 each.

Figure 2C:
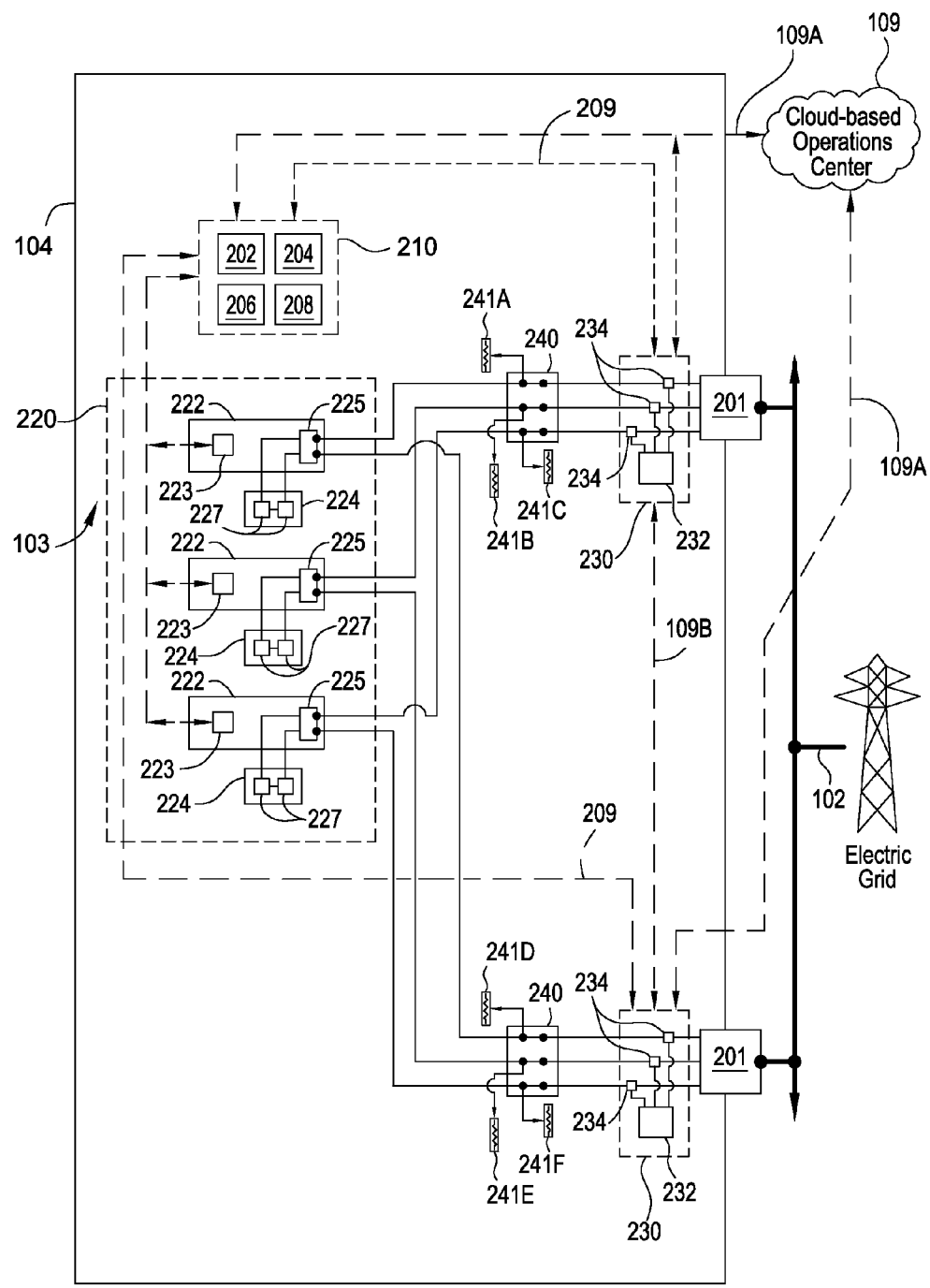
FIG. 2C schematically illustrates a single electric load location that is coupled to the electric grid through two electric meters, according to one embodiment of the invention.

FIG. 2C schematically illustrates a single electric load location 104 that is coupled to the electric grid 102 through two electric meters 201, according to one embodiment of the invention. Each of the electric meters 201 are configured to separately or cooperatively provide power billing information to the utility, due to the electric power drawn by the loads 241A-241F. As illustrated in FIG. 2C, a single distributed energy storage system 103 can be configured to control the fluctuation in power at the electric load location 104 and/or power level being drawn by a plurality of electric loads (e.g., electric loads 241A-241F) at the electric load location 104. In this configuration, the distributed energy storage systems 103 may include two or more power monitors 230, one or more power controllers 222 and a system controller 210. The bidirectional power converter 225 may also include components that are able to separately control the transfer of power between a conducting element 235, electric grid 102, and the energy source 224.

Figure 3:
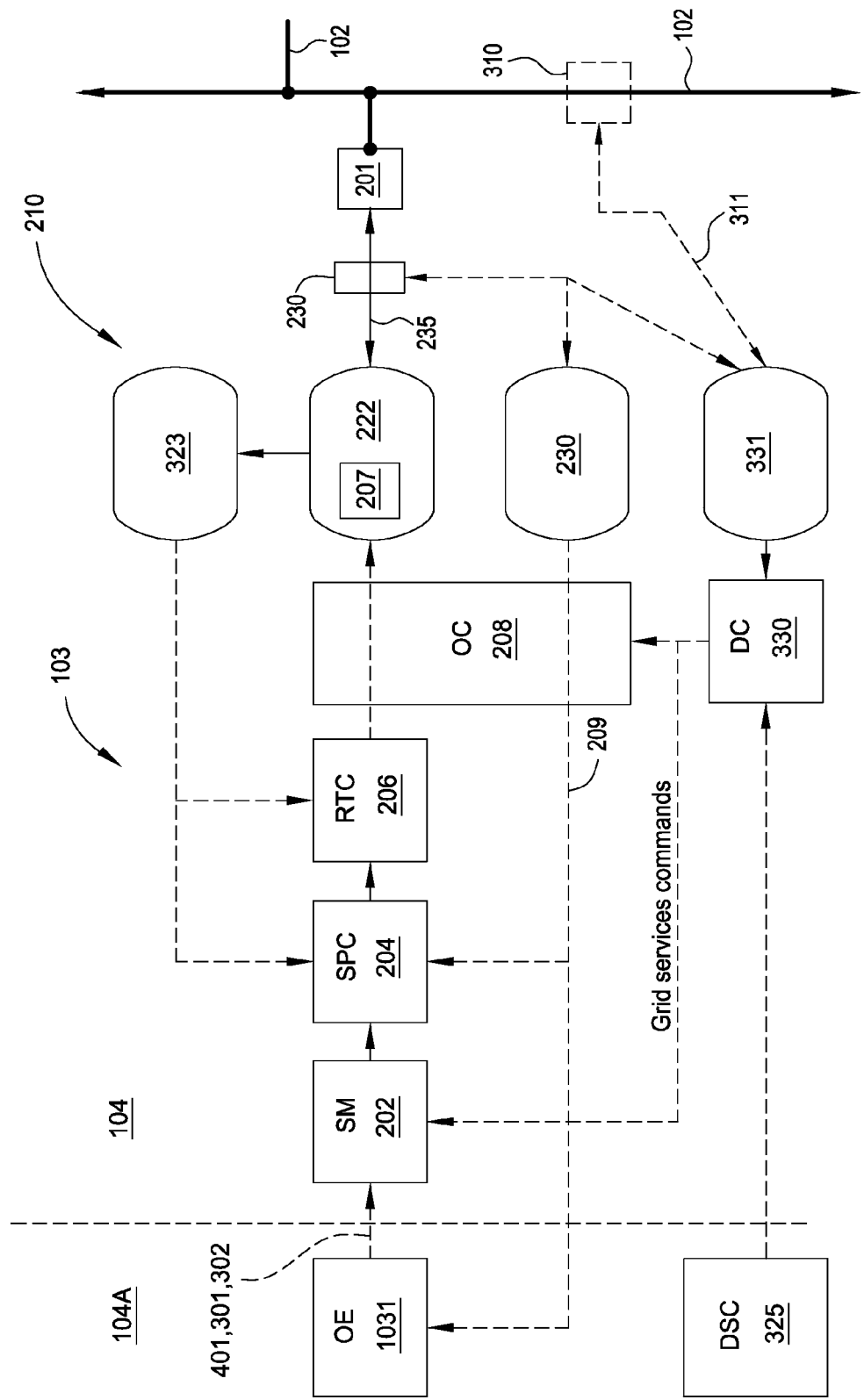
FIG. 3 illustrates a process flow diagram for controlling the fluctuation of power at an electric load location and/or power level being drawn by one or more electric load(s) at the electric load location by use of a distributed energy storage system, according to one embodiment of the invention.

FIG. 3 illustrates a process flow diagram for controlling the fluctuation of power at an electric load location 104 and/or power level being drawn by one or more electric load(s) at the electric load location 104 by use of a distributed energy storage system 103, according to one embodiment of the invention. In general, the software and hardware components in the system controller 210 (shown in FIGS. 2A-2C) are configured to provide control-based commands to control the one or more power controllers 222 based on the measured power data collected by power monitors 230. The overall control system of the distributed energy storage system 103 is made up of several software and hardware components that may be distributed across the local site (e.g., electric load location 104) and/or the Internet cloud. FIGS. 2A-2C discussed above illustrate some examples of different configurations of these components. The electric load location 104 contains hardware responsible for implementing the control system, including charging the batteries 227 from and discharging the batteries into the electric grid 102. Monitoring capability may be included in the bi-directional converter in the source power controller 223 that passes the measured charge and discharge information back to the system controller 210 in the local distributed energy storage system 103. Additionally, there may be a separate sensor (e.g., a monitoring device, also referred to herein as the power monitor 230) that monitors the overall building load (that is, the net of any charging or discharging) and also passes this information back to the system controller 210 in the distributed energy storage system 103.

The system controller 210 of the distributed energy storage system 103 may include up to six primarily software-based controllers that are stored within memory and executed by one or more processors associated with the system controller 210. As noted above, these six primarily software-based controllers may include the solution manger 202, the set-point controller 204 (described below in conjunction with FIG. 4), the run time controller 206 (described below in conjunction with FIG. 5), the local power controller 207, the offset controller 208, a droop controller 330, and an optimization engine 1031 (described below in conjunction with FIGS. 7 and 9). The various controllers in the control system, as noted above, will typically include a central processing unit (CPU) (not shown), memory (not shown), and support circuits (or I/O) (not shown). Software instructions and data can be coded and stored within the memory of one or more of the controllers and is used for instructing the CPU of the one or more of the controllers to control the various components in the distributed energy storage system 103.

The solution manager 202 exists on the local premise and is primarily responsible for communicating with the optimization engine 1031 and passing command information received therefrom to the set-point controller 204 and offset controller 208. In one embodiment, the solution manager 202 receives demand threshold control instructions (e.g., demand set-point curves 301) and battery state-of-charge curves 302 from the optimization engine 1031 and then determines at what time(s) of day the set-point controller 204 changes the demand set-point. For example, if during a period of low demand charges (e.g., energy cost is low), the solution manager 202 receives new information that a high demand charge period (e.g., energy cost is high) is approaching, the solution manager 202 passes along the new control set-point to which the set-point controller 204 should attempt to hold the premise load at that time. There are several events the solution manager 202 watches for in order to make changes to the set-point, including a soft failure event, a soft failure set point increment event, a manual set-point change event, a new solution received set-point update event, a set-point controller startup event, and a PID coefficient change event.

A soft failure event indicates that operating conditions of the distributed energy storage system 103 have gone outside the forecasted operating solution, or the demand has exceeded its predicted operating value(s) due to an unexpected variation in demand. This type of event is typically informational and allows the optimization engine 1031 to decide if intervention is required. A soft failure set point increment event, which can be either incremental or proportional, indicates whether a set point change is needed as a result of a soft failure event. Set point modifications are either incremental or proportional to the set point and utility and site loads. If the solution manager 202 decides that the correction to the soft failure should be incremental, then the set point will be adjusted upward based on the incremental value found in the forecasted battery curve layer for the current state-of-charge (SOC). If the solution manager 202 decides that the correction to the soft failure should be proportional, then the set point will be adjusted up or down based on the proportional difference between the utility and resulting load. Much like the incremental value, the proportional value used to correct for the soft failure event is found in the battery curve layer of the controlling software found in the solution manager 202 and is based on the current state-of-charge of the energy source 224. A manual set-point change event is recorded when a user manually changes the set point on the distributed energy storage system 103. A new solution received set-point update event indicates the set point is updated based on a newly received solution from the optimization engine 1031. This will generally occur when the distributed energy storage system 103 transitions from one billing cycle to another or when intervention by the user causes a regeneration of a new solution. A set-point controller startup event indicates that the set-point controller 204 was restarted, generally due to manual intervention of a user or when the distributed energy storage system 103 is restarted. A PID coefficient change event indicates that the PID coefficients, used in the run time controller 206, have been updated, for example to accommodate dynamic battery state-of-health (SOH) strategies.

Figure 4:
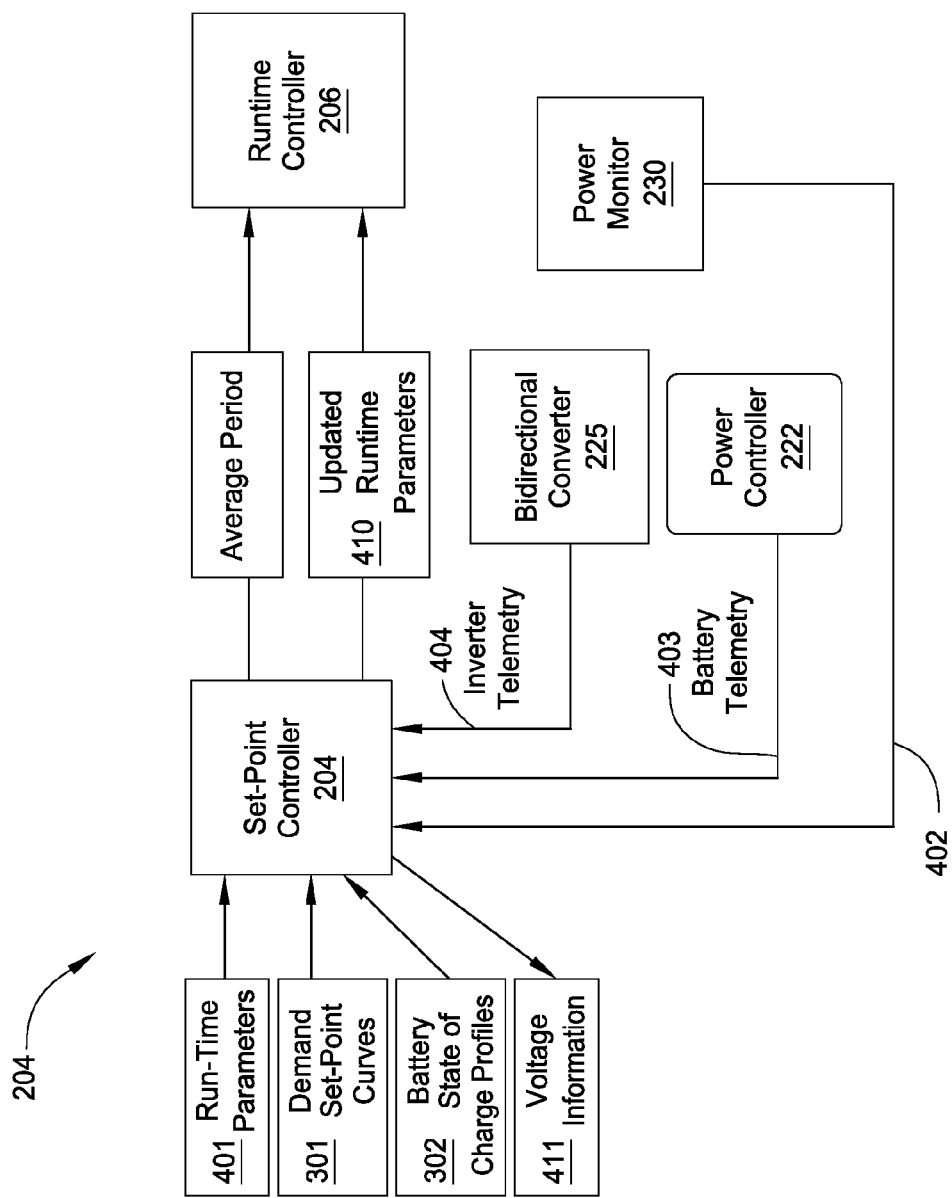
FIG. 4 illustrates the operation method and information flow provided to and/or used by a set-point controller, according to one or more embodiments of the invention.

The set-point controller 204 is used to manage the control set-point for each instant in time using information specified and received from the solution manager 202. As noted above, the control set-points are selected by the solution manager 202 to ensure that the system maintains enough energy reserve in the energy source 224 to manage the load at the electric load location 104 over a particular time period, such as a day or part of a day. FIG. 4 illustrates operation of set-point controller 204, according to one or more embodiments of the invention.

As shown in FIG. 4, in some embodiments, the set-point controller 204 receives the optimized runtime parameters 401 from the solution manager 202 and demand set-point curves 301 and battery state-of-charge profiles 302 from optimization engine 1031. Simultaneously, set-point controller 204 monitors the actual operating characteristics of energy storage system 103, including for example information 402 from power monitor 230 and battery telemetry 403 (e.g., battery SOC as a function of time) from power controller 222, and sends updated runtime parameters 410 (e.g., set-points, PID parameters) to the runtime controller 206. In some embodiments, set-point controller 204 also monitors transport delay information and other inverter telemetry 404 (e.g., power delivery information) from bidirectional power converters 225 or any other inverter/chargers associated with energy storage system 103.

The updated control parameters 410 are based on the received optimized operating parameters and/or the current operating state of the measured power being drawn by the attached electric loads at the energy storage system 103. The set-point controller 204 does this by receiving current real-time demand information from the observed site load monitor (e.g., power monitors 230), receiving real time battery state-of-charge information directly from hardware monitoring components (e.g., charge/discharge monitor 323), which may be found in the source power controller 223 in the power controllers 222, receiving battery telemetry 403 (e.g., real time charge and discharge information from the charge/discharge monitor 323), and then issuing commands (updated runtime parameters 410) to the run-time controller 206. The run-time controller 206 controls the charge or discharge of energy to or from the energy source 224 and to or from the electric grid 102, via the bi-directional power converter 225.

If the actual operating characteristics of the distributed energy storage system 103 fall outside of the expected operating parameters, the set-point controller 204 will adjust the updated runtime parameters 410 to correct for any variance from the actual or expected performance of the overall system. In some embodiments, set-point controller 204 is also configured to pass any variance information 411 back to the optimization engine 1031 so that the optimization engine 1031 can continue to run the most accurate simulations and issue newly optimized operating parameters.

Figure 5:
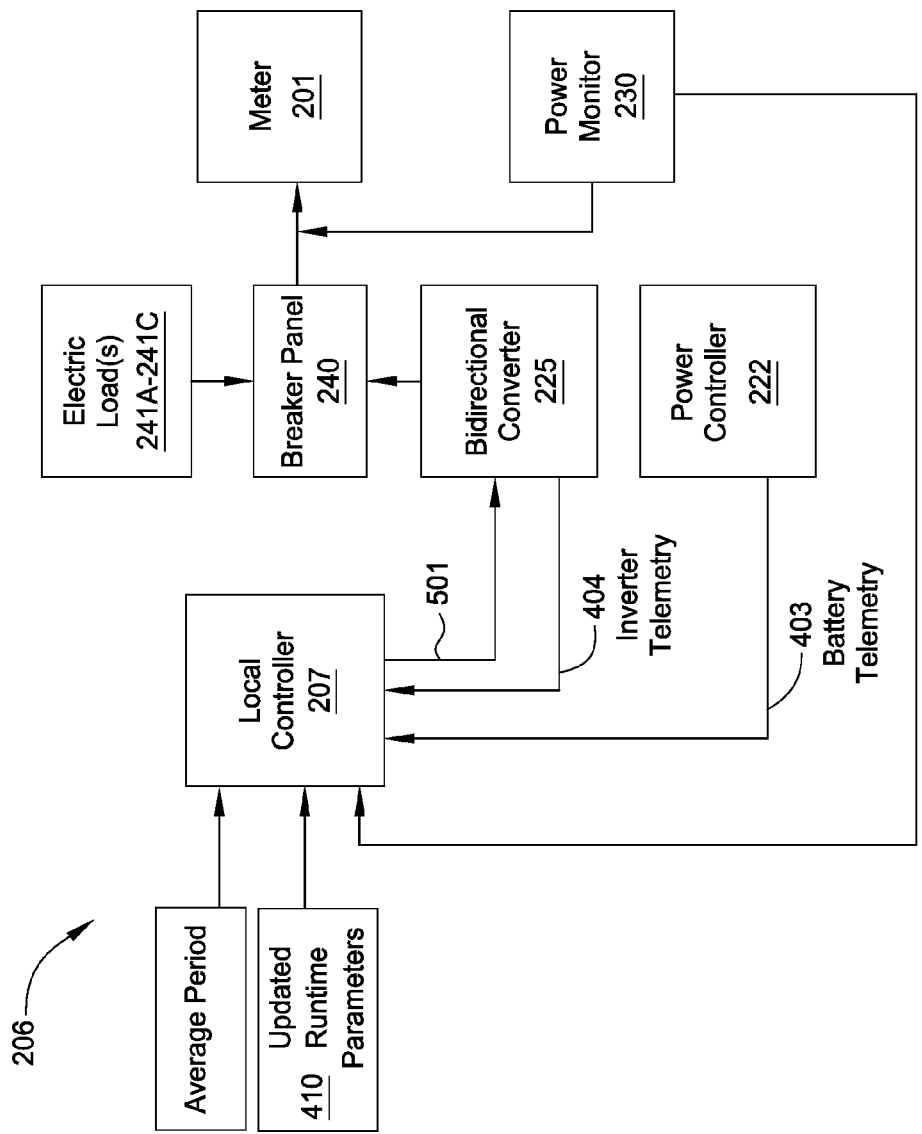
FIG. 5 illustrates the operation method and information flow provided to and/or used by a runtime controller, according to one or more embodiments of the invention.

The runtime controller 206 uses the updated runtime parameters 410 received from the set-point controller 204 to implement an optimized charging or discharging solution for the energy storage system 103. FIG. 5 illustrates the operation of the runtime controller 206 according to one or more embodiments of the invention. As shown, the runtime controller 206 generally receives the updated runtime parameters 410 from the set-point controller 204 and uses a feedback controller (e.g., local power controller 207), such as a PID controller, to implement the optimized charging or discharging solution determined by the set-point controller 204 utilizing the power electronics hardware in the bidirectional converter 225. The runtime controller 206 acts on the current demand set-point data, which may be included in updated runtime parameters 410, and sends the actual charge and discharge instructions 501 to the bidirectional converter 225 using standard control mechanisms, such as proportional integral and derivative (PID) types of control loops. The data received by runtime controller 206 may include the current demand set-point curves 301 generated by the optimization engine 1031 and/or solution manager 202. The runtime controller 206 then compares the received inputs and supplies a control signal (charge and discharge instructions 501) to the bidirectional converter 225, so that a desired amount of energy is received or discharged at that instant in time.

Based on charge and discharge instructions 501, fluctuations in the power used by the electric load location 104 can be controlled or damped by the charging and discharging of the energy source 224, such as a battery array in the energy source 224, that is coupled to the power-receiving portion of the electric load location 104. The energy source 224 may be configured to deliver and/or receive an amount of energy at any instant in time to and/or from the NC power system of the electric load location 104. The energy source 224 may include a plurality of batteries (e.g., lithium ion batteries, lead acid batteries, etc.) that are electrically coupled to a portion of the A/C power system of the electric load location 104. The plurality of batteries may be connected in a series and/or a parallel configuration to the NC power system. The charging and discharging of the energy source 224 can be controlled by use of the power electronics hardware in the bidirectional converter 225, which may include A/C switches, diodes, capacitors and/or inductors. In some embodiments, the runtime controller 206 is configured to constantly send the actual charge and discharge instructions 501 to the power controllers 222 while monitoring charging and discharging behavior of the energy source(s) 224 in a closed control loop using a charge/discharge monitor, such as the charge/discharge monitor 323 in FIG. 3.

The energy storage device 323 includes one or more sensors that are adapted to monitor the state-of-charge of one or more energy source components, such as batteries, found within each energy source 224. In one example, the energy storage device 323 is able monitor the state-of-charge of each battery array and/or each battery within a battery array to determine its relative health and state-of-charge (e.g., amount of energy stored in the batteries). In some embodiments, the charge/discharge monitor 323 is configured to deliver charging and discharging behavior information (e.g., battery telemetry data) to the runtime controller 206 and set-point controller 204, so that the current demand set-point data used by the runtime controller 206 can be updated and the set-point at each instant in time is the better managed using commands sent from the set-point controller 204.

The local power controller 207 is used to execute the commands that are received from the runtime controller 206, and thus execute the actual charge and discharge processes controlled by the components in the bidirectional converter 225. The local power controller 207 may include various standard control mechanisms, such as PID control loops, and may be run using a processor found within the system controller 210 (FIG. 2A) or power controllers 222 (FIG. 3).

The optional offset controller 208 is used to execute grid services commands that are received by the electric load location 104, and is used as a higher-level system override of the control provided by the system controller 210. The offset controller 208 may be configured to modify the charge or discharge command to the bidirectional converter 225 and the telemetry information, such as current load, from the resultant load monitor (e.g., sensor power monitors 230). The offset controller 208 thus adjusts the power absorbed or delivered to the electrical grid 102 by the energy source 224 based on instructions received by the system controller 210 to help resolve electrical issues that may be occurring on the grid 102 at that time (e.g., voltage support, frequency regulation, etc.). For example, if the solution manager 202 calls for a grid services event that calls for an additional 2 kW of power, the offset controller 208 would modify the discharge command from the runtime controller 206 to increase by 2 kW of power, but would also add that 2 kW of power back to the telemetry of the power monitors 230 so that the set-point controller 204 and the optimization engine 1031 would not see a deviation from the predicted load and thereby not disturbing the optimized instruction set that is currently being executed.

The droop controller 330 takes frequency measurements from a sensor 310 and a device 331 that are coupled to the electric grid 102 via a wired or wireless communication link 311. This frequency is compared to the nominal grid frequency for the operating region, for example in the United States it would be compared to 60.000 Hz. When commanded to be in frequency regulation mode from the distributed system gateway 325 (FIG. 3), if the frequency of the grid is below the nominal frequency the droop controller 330 will adjust the offset controller 208 (as shown in FIG. 3) to so that commands to the energy source 224 are altered to increase the discharge rate. Alternatively, when the grid frequency is measured to be greater than 60.000 Hz the commands to the energy source 224 can be altered to store energy at a greater rate than required for local demand reduction. The response characteristics, such as the speed and magnitude of the response, are parameters that are controlled by the distributed system gateway 325. The distributed system gateway 325 can be a cloud-based interface and controller that allows for specific grid services commands to be sent to the distributed energy storage system 103 outside of the control of optimization engine 1031. Thus, the droop controller 330, much like the optional offset controller 208, can be used as a higher-level system override of the control provided by the system controller 210.

In operation, the control method used to maintain the required demand set-point(s) can employ a proportional-integral-derivative (PID) controller that heavily relies on the information received from an optimization engine 1031. In some embodiments, the control method uses a standard PID control loop, where the process value is the observed electric load at the local premise, the set-point is the demand in kilowatts that the storage system attempts to prevent the local load from exceeding, and the manipulated value is the amount of energy discharged by the bidirectional power converters 225. In simple terms, if the local load is sensed or observed to exceed the demand set-point, then the bidirectional converter 225 receives a command to discharge until the observed electric load begins to drop below the demand set-point. This control loop may occur at a frequency from 100 milliseconds or less to multiple seconds depending on load and volatility, and on the granularity of the control output of the bidirectional converter 225. For example, said frequency may vary as a function of the ability of the bidirectional converter 225 to control output, e.g., within 10's of watts, hundreds of watts, etc. Given this control output granularity and speed, the control system 210 can react within a suitable response time to sensed changes in the electric load sensed by power monitor 230.

In some configurations, the distributed energy storage system 103 is computing resource constrained. Therefore, the generation of the control optimization instructions occurs at an external location (e.g., operations center 109) and then a distilled set of instructions is passed down to one or more of energy storage systems 103 from the external location. The predictive nature and/or processes found in the control optimization instructions is particularly beneficial, since these control optimization instructions enable a minimized or otherwise reduced amount of energy storage to be used at the premise. Since the energy storage devices, such as the energy source 224, can be expensive and have a finite lifetime that is affected by amount of use, the system controller 210 can be used to further improve the lifetime of the energy source 224 and thus reduce the operating costs of distributed energy storage system 103. For example, if the optimization engine 1031 forecasts that the maximum peak load for the day will occur at 4 PM, the instruction set includes this forecast, so that the distributed energy storage system 103 does not overreact to spikes in demand prior to 4 PM, and therefore enough energy capacity will remain in the energy source 224 for the major 4 PM event. If an unpredicted event occurs prior to 4 PM, the distributed energy storage system 103 will still react correctly and hold the set-point. This unexpected event information is sent back to the optimization engine 1031, where an updated set of instructions is created for the storage system, which may include a higher set-point later in the day so the energy source 224's state-of-charge is not depleted.

According to embodiments of the invention, distributed energy storage system 103 maximizes economic return by optimally managing energy use at the electric load location 104. Rather than simply reacting to gross changes in electricity demand, distributed energy storage system 103 is configured to use a partially predicted command set that may be statistically derived from a large quantity of various data inputs. In practice, some embodiments of distributed energy storage system 103 may lack the processing power, data storage capacity, and/or interfaces to remote data stores that facilitate calculating such a partially predicted command set locally in a timely manner. Consequently, in such embodiments, the partially predicted command set may be calculated at a remote location and the information distilled to a lightweight, i.e., easily transmitted, set of instructions that the distributed storage system 103 can utilize in real-time. For example, in some embodiments, optimization engine 1031 is configured to calculate the command set at such a remote location (e.g., operations center 109 in FIGS. 2A-2C) and then deliver the command set to the energy storage system 103.

Additionally, in some embodiments, the created command set may include a predictive element, as opposed to simply a fixed set point, so that the distributed energy storage system 103 can operate autonomously for some time (e.g., hours or days) in the event that the distributed energy storage system 103 is disconnected from the central controller and is unable to communicate with a central command center (e.g., operations center 109). For example, disconnection can occur if the local communications network is disconnected for maintenance or if damage occurs to the communication wiring. In such a situation, the predictive element of the command set facilitates resilient operation of distributed energy storage system 103 with respect to various future conditions, such as demand spikes or changes in rate schedule. Thus, in some embodiments, distributed energy storage system 103 is configured to operate using a robust, but small (in terms of data size) command set that is received from a central command center (e.g., from optimization engine 1031 at operations center 109) and that allows autonomous operation (via a predictive element) until communications are reconnected with the central command center. In other words, embodiments of the invention can be used to create a concise set of operating parameters in an external data center that the distributed energy storage system 103 can understand and implement while the distributed energy storage system 103 is either connected or disconnected from the communications network, which couples the external data center and the distributed energy storage system 103. These operating parameters include a statistically generated and tiered expected state-of-charge of the battery or batteries in the distributed energy storage system 103 (e.g., the battery state-of-charge profiles 302 in FIGS. 4 and 5) as well as a set of set points at which to maintain the electric power demand at the load site to enable the forecasted economic return (e.g., the time-based demand set-point curves 301 in FIGS. 4 and 5). Examples of the battery state-of-charge profiles 302 and their uses are further discussed below in conjunction with FIGS. 10-14 and 15A-15C.

Thus, in some embodiments, a process is provided in which operating parameters are computed through simulations and other statistical techniques in a remote data center. These data are then distilled down into a lightweight set of storage system operating parameters (e.g., in the several kilobytes size range), which are acted upon by the controlling elements in the energy storage system 103, and then any changes in operating characteristics are communicated back to the central data center (e.g., operations center 109) for continual operating parameter optimization.

The optimization engine 1031 may exist in the cloud 104A, as shown in FIG. 3, or alternatively at an electric load location 104, and builds the optimal operating instructions for one or more of the distributed energy storage systems 103 by running simulations using multiple categories of data, which may include: electric rate plan and tariff information (e.g., utility rates, billing period, temporal energy and demand prices, and averaging periods), utility data (e.g., requests for grid services like voltage support and frequency regulation), current and future weather data, (e.g., time of day, sunrise and sunset times, temperature, cloud cover, and other weather forecasts), geographic location, local solar production, local incident light, customer type, building specifications (e.g., information relating to the electric load location, such as building material, square footage, age, HVAC type and type of equipment used at the electric load location, etc.), grid operator data (e.g., locational marginal price, area control error, automatic generation control, etc.), and time (e.g., time of day) data, high-resolution energy usage data (e.g., collected high sample rate energy usage data (e.g., <1 minute)) provided by the target energy storage system, and/or load prediction taken from historical patterns for the specific site and similar sites, which may be received from one or more external data sources. Optimization engine 1031, which may be configured as a software-based analytics engine, then uses this data to simulate and create various operating parameter results by iteratively processing this data to find an optimal solution. The operating parameter results so determined may include optimized runtime parameters 401, demand set-point curves 301, and battery state-of-charge profiles 302 of FIGS. 4 and 5. For example, in some embodiments, optimization engine 1031 uses an energy storage hardware simulator farm as illustrated in FIG. 6 to help determine and create various operating parameters.

Figure 6:
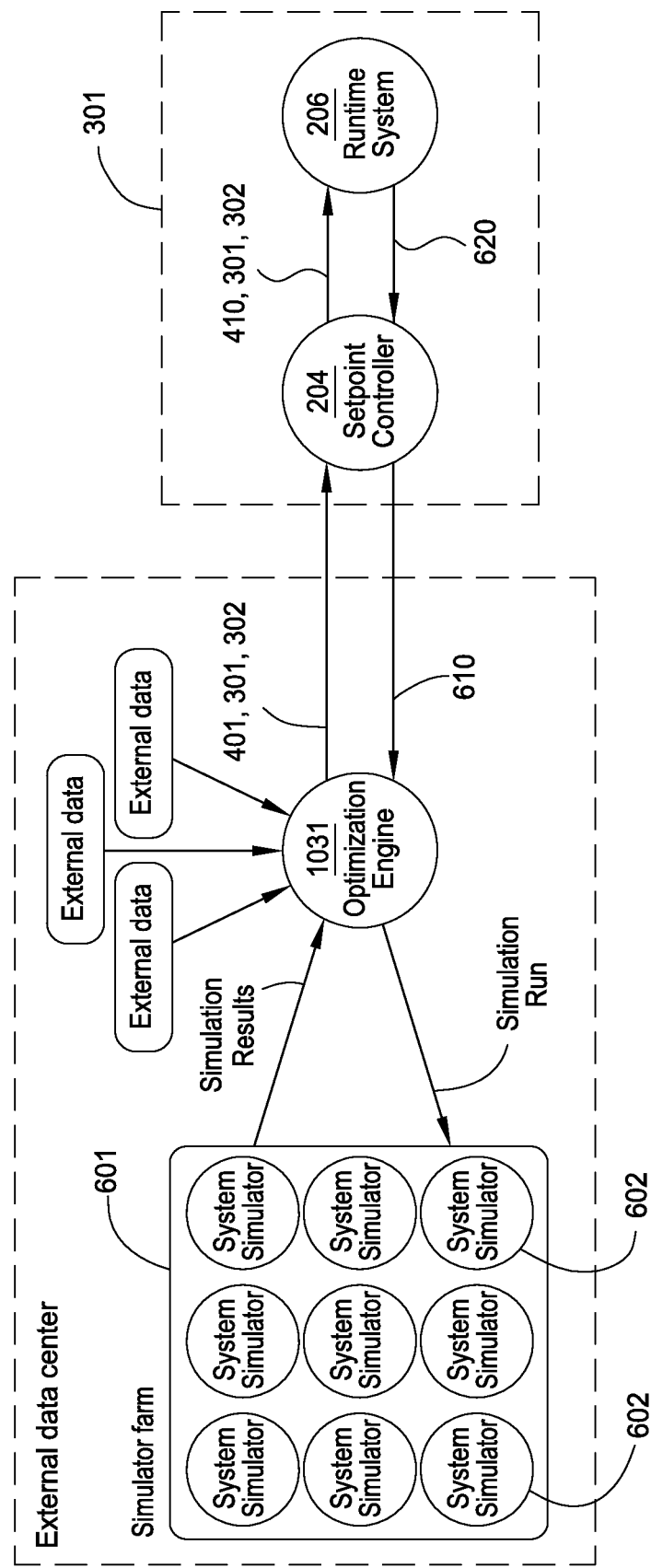
FIG. 6 illustrates an overview of a communication process between an optimization engine, a simulator farm, and a distributed energy storage system, according to an embodiment of the invention.

FIG. 6 illustrates an overview of a communication process between an optimization engine 1031, a simulator farm 601, and a distributed energy storage system 103, according to an embodiment of the invention. The simulation farm 601 may be located in a data center external to the distributed energy storage systems 103 and, as shown, may be configured with a plurality of system simulators 602 to run multiple simulations using the various categories of data listed above as input variables. Each simulation can then produce operating parameters and storage system results (e.g., optimized runtime parameters 401, demand set-point curves 301 and battery state-of-charge profiles 302) for a particular distributed energy storage system 103, including energy use predictions that are used by the semi-autonomous control system of each distributed energy storage system 103. Simulator farm 601 may be hosted in the same cloud-based system or computer as the optimization engine 1031, or may be associated with a dedicated cloud or computer or other computing device.

After completing a simulation to compute the optimal power control strategy for a distributed energy storage system 103, the optimization engine 1031 then packages and passes down an array of time-based demand set-point curves 301, battery state-of-charge profiles 302, and optimized runtime parameters 401 to the set-point controller 204 of the distributed energy storage system 103, which then acts upon them. Demand set-point curves 301 provide a series of time-based power level demand set-points, so the distributed energy storage system 103 knows what kilowatt set-point to hold the local load(s) (e.g., electric load(s) 241A-241C in FIGS. 2A-2C) to during different times of day. The battery state-of-charge profile 302 provides a set of zones that the set-point controller 204 will act on if the current state-of-charge moves out of the safe zone at different times over a desired time period (e.g., a day). The system controller 210 uses this information so that the power control strategy can be adjusted if the battery state-of-charge moves outside a predetermined safe state-of-charge level, due to unpredicted changes in the load at the electric load location 104.

The strategy computed by the optimization engine 1031 may also include grid services instructions that control the offset controller 208 via the solution manager 202. Grid services may include frequency regulation, voltage support, and demand response commands, which typically do not disrupt the control loop that is optimizing the power provided to local premise load(s), and are used to allow the distributed energy storage system 103 to help support and resolve issues that arise on the greater electrical grid, which is outside of the commercial electric load location 104.

As described above in conjunction with FIGS. 2A-2C, the set-point controller 204 unpackages the operating parameters and uses this data to determine a runtime plan, e.g., updated runtime parameters 410, as a guideline for operation of distributed energy storage system 103. In some embodiments, set-point controller 204 may also be configured to report back to the optimization engine 1031 any variances in expected behavior using runtime variance 610 data, based on the actual behavior of distributed energy storage system 103, e.g., system telemetry 620. The optimization engine 1031 can then use runtime variance 610 to run another set of simulations using one or more system simulators 602 in order to compute a new optimal solution that accounts for these variations at each energy storage system 103.

Figure 7:
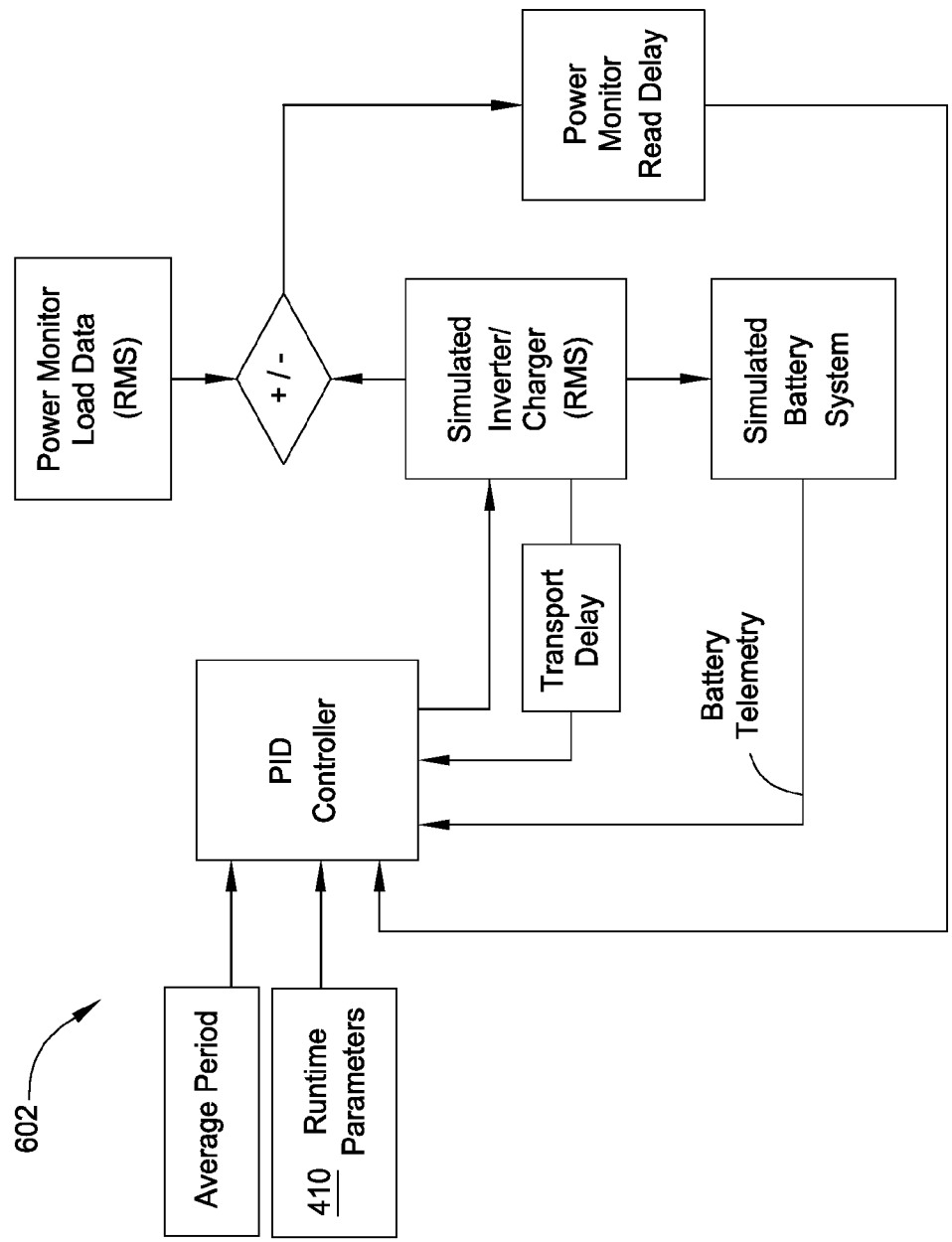
FIG. 7 illustrates an overview of a system simulator process, according to an embodiment of the invention.

FIG. 7 illustrates an overview of a system simulator process, according to an embodiment of the invention. An individual system simulator 602 may be configured to behave exactly like a particular distributed energy storage system 103, but is entirely software-based. A system simulator 602 takes in the operating parameters produced by the optimization engine 1031 as well as the utility's electric usage billing period and passes this information into a feedback controller that simulates the control loop of a particular distributed energy storage system 103. In one embodiment, the system simulator 602 generates data in sub-second or greater increments. However, the utility that delivers the electrical power typically measures for demand peaks in longer multi-minute time blocks. Therefore, in some embodiments, the simulation time period optimizations are matched to the site's utility billing time periods. If the operating parameters are optimized for a time significantly shorter than the utility billing time period associated with a particular distributed energy storage system 103 being simulated, more computational resources than necessary may be used to reach a desired solution. Alternatively, if the operating parameters are optimized for a time significantly longer than the utility billing time period associated with a particular distributed energy storage system 103 being simulated, a demand spike may be missed.

As noted above, optimization engine 1031 can be used to create a concise set of operating parameters (including time-based demand set-point curves 301, battery state-of-charge profiles 302, and optimized runtime parameters 401) that the distributed energy storage system 103 can understand and implement. Furthermore, these operating parameters can be used by the distributed energy storage system 103 even if subsequently disconnected from the communications network coupling the optimization engine 1031 and the distributed energy storage system 103. The system controller 210 of the distributed energy storage system 103 uses the time-based demand set-point curves 301 and battery state-of-charge profiles 302, collectively known as feedback based curves, to control the storage and release of energy by the distributed energy storage system 103. These battery state-of-charge profiles, or battery curves, can be used for a single battery, a group of connected batteries in a single storage device, or a group of batteries contained in several networked energy devices, such as in the energy source 224. A battery state-of-charge profile 302 represents a targeted state-of-charge of the battery or battery array as a function of time and will vary in the amount of power correction from 0% to 100%. A time-based demand set-point curve 301 represents one or more peak demands that the site should not exceed over the course of a specified time period, e.g., one day. There may be multiple such demand peaks during a particular day, and each may be defined by power as a function of time of day. The battery state-of-charge profile, or battery curve, can be used by the system controller to determine an amount of energy to transfer to the electric line (e.g., conducting element 235) based on a measured amount of charge in the energy source 224.

The time-based demand set-point curves 301 and battery state-of-charge profiles 302 can be transmitted either as a matrix or table of time-indexed values, or as a time-varying equation. The points defining time-based demand set-point curves 301 and battery state-of-charge profiles 302 are synchronized in time and are time-delineated in relatively short time increments (such as one minute intervals). The matrix or equation that allows the system controller 210 to build the battery state-of-charge profiles 302 may be in a format of battery state-of-charge percentage with respect to time. Such a matrix or equation allows the system controller 210 to build the demand set-point curve, which comprises electric power (in kilowatts, for example) with respect to time.

During operation, the system controller 210 attempts to maintain the given set-points as time progresses by monitoring power delivered to and from the electric load location 104 through a power delivery line (e.g., one or more conducting elements 235) coupled to electric meter 201, and storing and releasing energy to the delivery line from a storage device, such as the energy source 224. The battery state-of-charge profiles 302 received by the system controller 210 provides a guide for what state-of-charge is expected to be for the distributed energy storage system 103 in order to maintain the demand set-points. If the actual state-of-charge deviates significantly from the expected state-of-charge, the system controller 210 will adjust the demand set-point and report the variance back to the optimization engine 1031.

According to some embodiments, a set of operating parameters provided to distributed energy storage system 103 by optimization engine 1031 may include more than a single demand set-point curve 301 and a single battery state-of-charge profile 302 (or battery curves). In some embodiments, these operating parameters may includes a matrix of synchronized battery and demand set-point data, including "default," "optimized," and "current" curve sets. The simplified default curve set is calculated at system installation and initial setup of system controller 210. This set includes a simple demand set-point curve 301 and a simple battery state-of-charge profile 302 that can be used by the system controller 210. The optimized battery curve set is calculated by the optimization engine 1031 at the beginning of the billing period (e.g., once per month) or when changes occur in energy and power utility rates. Furthermore, each curve in the optimized curve set may include multiple continuous or discrete value set-point curves for a 24-hour period as well as a higher resolution state-of-charge curves that can be used by the system controller 210 to control the distributed energy system 103. The current curve set uses operational feedback from the energy source 224 as well as real-time external data (such as local weather conditions) to continually optimize and refine the operation of the distributed energy storage system 103. The current curve set can be generated by components in the operation center 109, and/or, in some cases, locally by the system controller 210.

If communication is lost to optimization engine 1031, the distributed energy storage system 103 uses the optimized curve set for as long as feasible, and, if an unpredicted event occurs, can revert back to a set of default parameters set by the default curve. If demand at the distributed energy storage system 103 begins to push the state-of-charge beyond the capability of energy source 224 to maintain the current set-point, the distributed energy storage system 103 adjusts the set-point until the desired state-of-charge can be maintained based on pre-computed back-off values. In some embodiments, distributed energy storage system 103 is configured to use the optimized curve set when a short-term communication loss occurs (e.g., hours or days) and the default curve set when a long-term communication loss occurs (e.g., several weeks).

Having several sets of curves provides the distributed energy storage system 103 with maximum flexibility in the case of abnormal demand conditions and/or loss of communication with the optimization engine 1031. If the distributed energy storage system 103 loses communication and has only one un-optimized demand set-point curve 301 and one un-optimized battery state-of-charge profile 302 available, the distributed energy storage system 103 can potentially run out of stored energy and fail to meet the scheduled requirements. This is because un-optimized operational data does not benefit from the ability of the optimization engine 1031 to "learn" and forecast how a particular electric load location 104 uses energy. However, in embodiments in which multiple demand set-point curves 301 (e.g., battery curves) and/or battery state-of-charge profile 302 are available to the distributed energy storage system 103, the current data set is the best optimized data set and is typically used instead of the default or optimized data sets. Moreover, having multiple demand set-point curves 301 and/or battery state-of-charge profiles 302 available in this way advantageously includes inherent error checking. Specifically, if load conditions fall out of range of the latest set of data, the distributed energy storage system 103 may request a new set of battery curves and demand set-point data from the central data center.

Figure 8A:
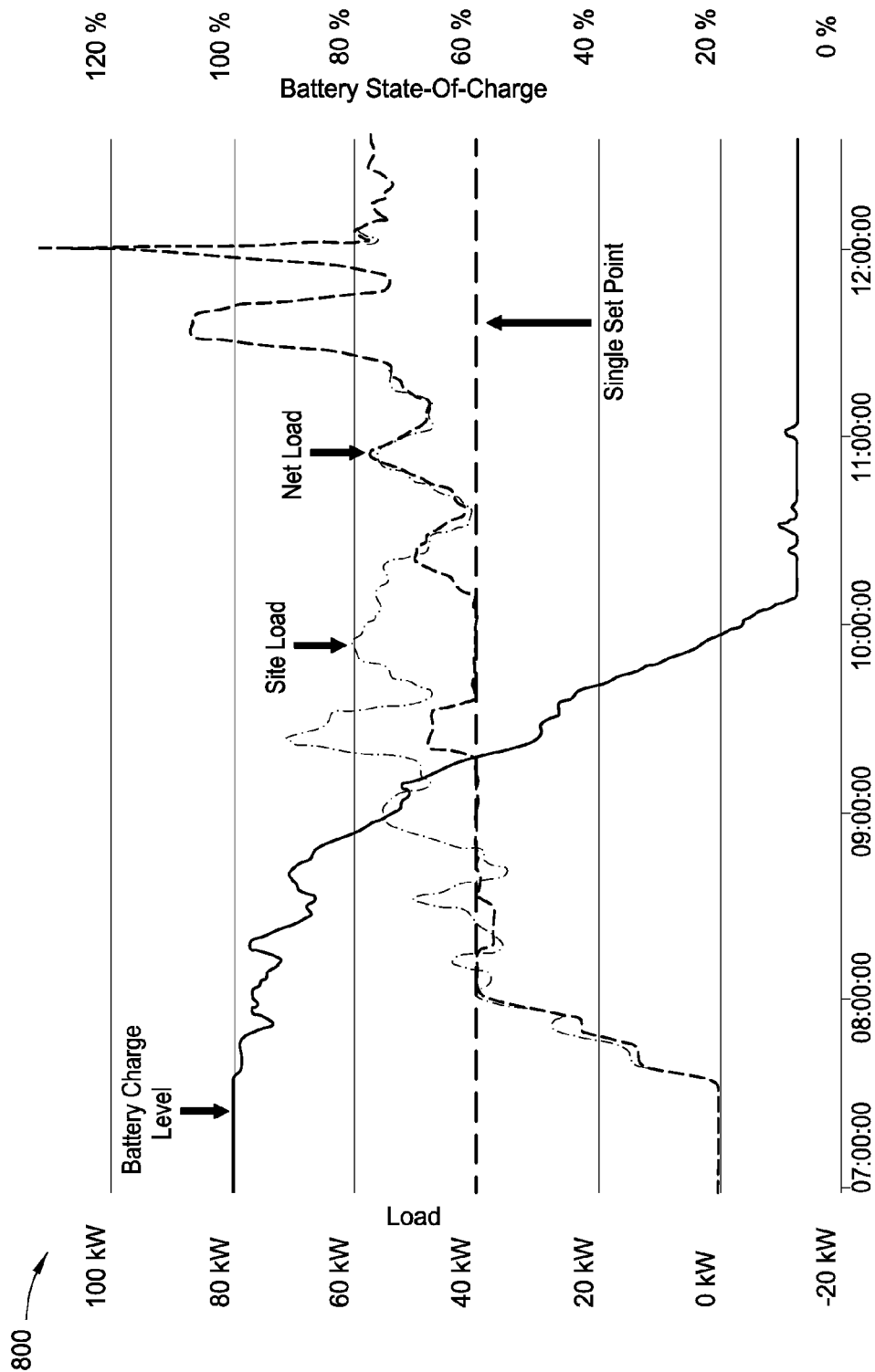
FIG. 8A is a graph that illustrates the performance over a business day of a prior art energy storage system using a single-demand set-point.

FIG. 8A illustrates a graph 800 that shows the performance over a business day of a conventional (prior art) energy storage system using a single-demand set-point. Graph 800 includes a battery charge level curve, which illustrates the amount of charge contained in the batteries, a site load curve, a net load curve, and a single demand set-point having a fixed value of 40 kW. The battery charge level curve indicates percentage charge remaining in the battery array over time of an energy storage system located at an electrical load location, such as a commercial building. The site load curve indicates a varying electrical load over time of the electrical load location, and the net load curve indicates a varying net electrical load over time of the electrical load location, i.e., the quantity of electrical energy actually delivered to the electrical load location from an electrical grid. Thus, at any point in time in graph 800, the value indicated by the net load curve is equal to the corresponding site load value minus any energy provided to the electrical load location by the conventional energy storage system.

At the beginning of a business day, for example at 7 a.m., the battery array of the energy storage system is fully charged (100%) and, over time the charge drops as energy is provided to the electrical load location by the battery array. Because the single demand set-point is fixed at 40 kW, the energy storage system provides electrical energy to the electrical load location at whatever rate that prevents the net load of the electrical load location from exceeding 40 kW. In this way, additional tariffs associated with receiving energy at a rate of greater than 40 kW are avoided. However, because the battery array of the energy storage system has very limited capacity, the battery array is quickly discharged to essentially 0% charge only a few hours after the site load exceeds the single demand set-point. In the example illustrated in FIG. 8A, the battery array is fully discharged by 10 a.m., which is less than 2.5 hours after the site load initially exceeds the single demand set-point of 40 kW. Consequently, any demand spikes that occur after that time (10 am) cannot be reduced by the conventional energy storage system. Because several such spikes may occur later in the business day in a commercial building, as shown in FIG. 8A, this is highly undesirable, since tariffs associated with receiving energy at a rate greater than 80 kW and 100 kW are applied to the electrical load location on the business day represented by FIG. 8A.

Figure 8B:
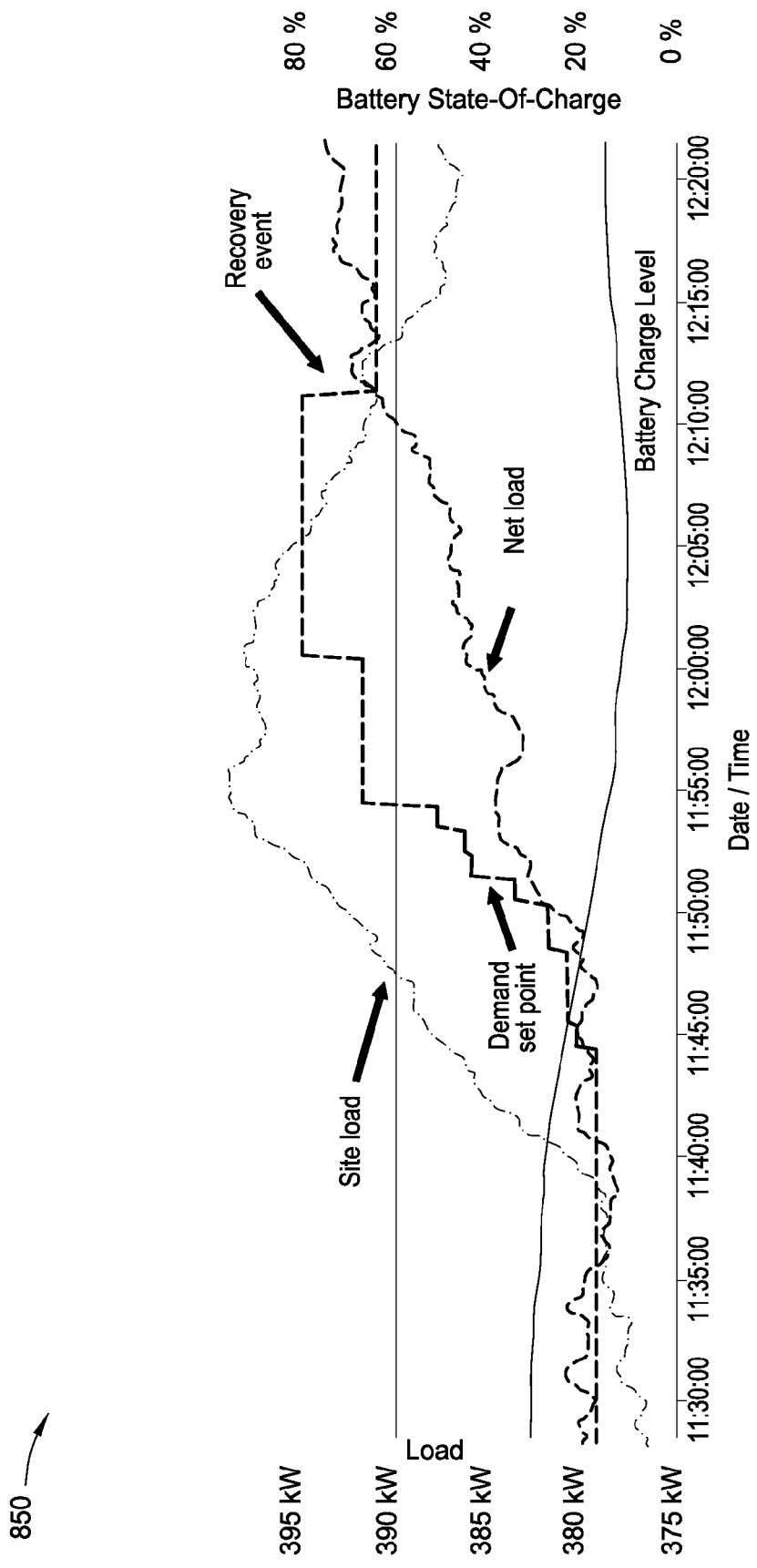
FIG. 8B is a graph that illustrates the performance over a business day of an energy storage system configured according to one or more embodiments of the invention.

FIG. 8B illustrates a graph 850 that shows the performance over a business day of an energy storage system configured according to one or more embodiments of the invention. Graph 850 includes a battery charge level curve, a site load curve, a net load curve, and a demand set-point curve having various values at different times of the business day. The battery charge level curve, the site load curve, and the net load curve have the same definitions provided with respect to graph 800 in FIG. 8A. In contrast to graph 800, graph 850 includes a demand set-point curve that is adapted to vary with time over the course of a single day, as shown in FIG. 8B. This demand set-point curve (analogous to the above-described demand set-point curves 301) may be provided by a software-based analytics engines, such as the optimization engine 1031, and therefore can be tailored specifically to the charging and discharging behavior of the electrical load location 104. The demand set-point curve illustrated in graph 850 is a stepped set-point curve that includes multiple discrete values. In one configuration, as illustrated in FIG. 8B, the stepped set-point curve includes multiple periods of time, of variable length, in which the set-point is maintained at a constant level.

Figure 8C:
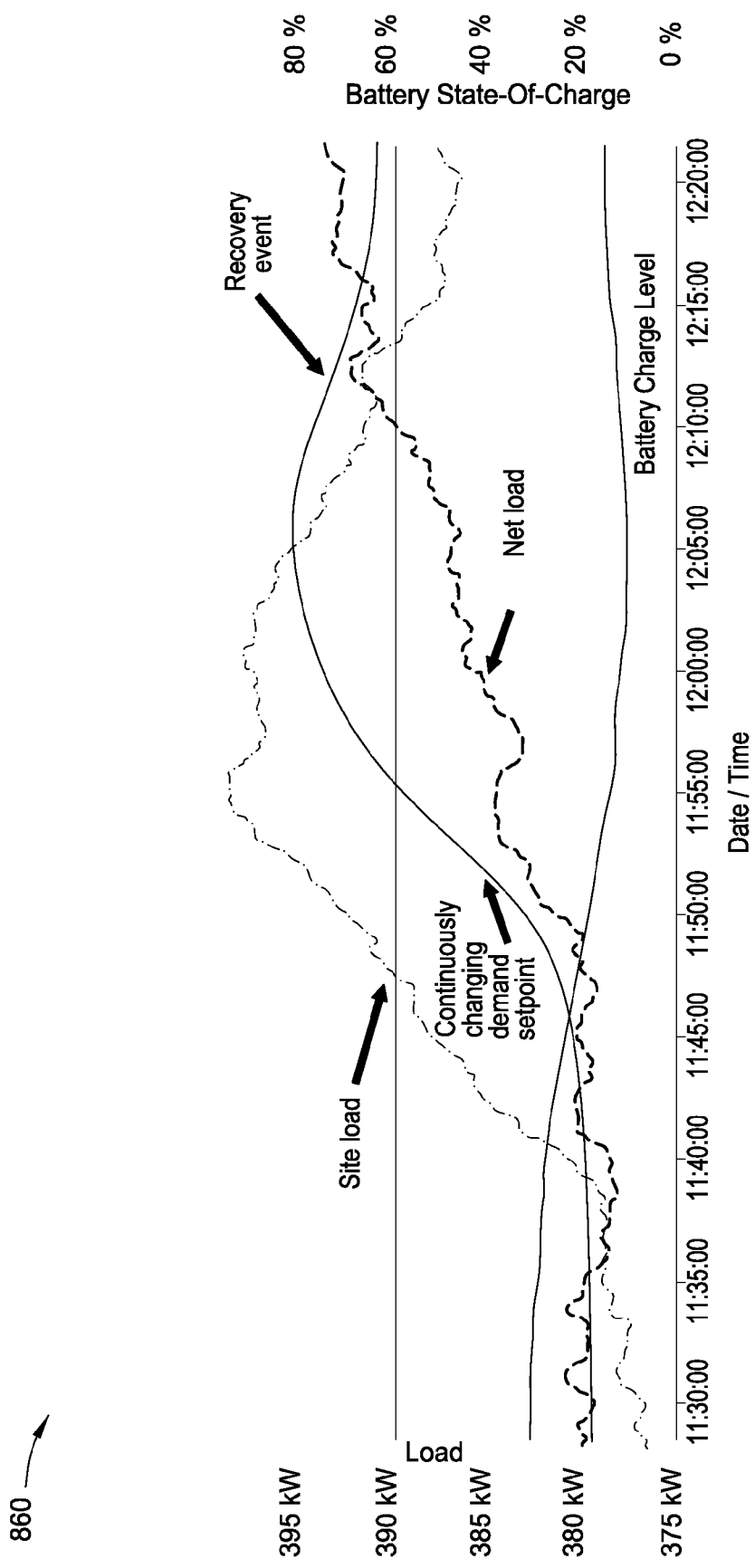
FIG. 8C is a graph that illustrates the performance over a business day of an energy storage system configured according to one or more embodiments of the invention.

FIG. 8C illustrates a graph 860 that shows the performance over a business day of an energy storage system configured according to one or more embodiments of the invention. Graph 860 includes a battery charge level curve, a site load curve, a net load curve, and a continuously varying demand set-point curve that varies continuously with time over the course of a particular time period, such as a business day. The battery charge level curve, the site load curve, and the net load curve have the same definitions provided with respect to graph 800 in FIG. 8A. This continuously varying demand set-point curve may be provided by a software-based analytics engines, such as the optimization engine 1031, and therefore can be tailored specifically to the charging and discharging behavior of the electrical load location 104.

According to some embodiments, an energy storage system associated with graph 850 and/or graph 860 is configured to maintain a current demand set-point indicated by the demand set-point curve by monitoring the load of the electric load location and releasing a suitable quantity of energy to the electric load location at different times of the day. The demand set-point curve, which provides a demand set-point for each particular time of day, varies with time and is selected by the set-point controller 204 and delivered to and used by the system controller 210. Consequently, the control parameters created by the optimization engine 1031 are used to create the demand set-point curve that takes into account demand spikes that can occur later in the business day. For example, the demand set-points for times earlier in a business day may be selected or adjusted to conserve energy in the energy storage system 224 to allow demand spikes that occur later in the business day to be negated. Thus, the energy storage system discharges to keep demand at the electrical load location 104 from exceeding these various adjusted set-points. In this way, charges associated with demand spikes can be avoided, even when such demand spikes occur later in a business day.

Furthermore, in some embodiments, the rate at which energy is delivered to the electric load location by the energy storage system 103 is also managed according to a target battery state-of-charge curve received by the solution manager 202, such as the above-described battery state-of-charge curve 302. A target battery state-of-charge curve indicates what state-of-charge at any time of the business day is predicted to allow the demand set-points of the demand set-point curve to be maintained. In such embodiments, when an actual or measured charge of the energy storage system falls below a specified value in the target battery state-of-charge curve, a new demand set-point curve and/or target battery state-of-charge curve may be requested from the optimization engine 1031. Various embodiments of target battery state-of-charge curves are described herein in conjunction with FIGS. 15A-15C.

Thus, in contrast to conventional energy storage systems that use a fixed demand set-point, embodiments of the invention facilitate maximizing the finite energy storage capacity of an energy storage system and reducing the unnecessary usage of such systems during less beneficial times of the day. For example, by use of the optimized solutions provided by the optimization engine, such as including a relatively high target battery state-of-charge earlier in the day, energy in an energy storage system is reserved for preventing more costly demand peaks that occur later in the day. One will note, by use of the control techniques described herein, and as illustrated in FIG. 8B, the state-of-charge of the energy source 224 can be controlled such that the battery charge level curve does not reach a 0% state-of-charge even when demand management becomes increasingly challenged due to increasing load.

Figure 9:
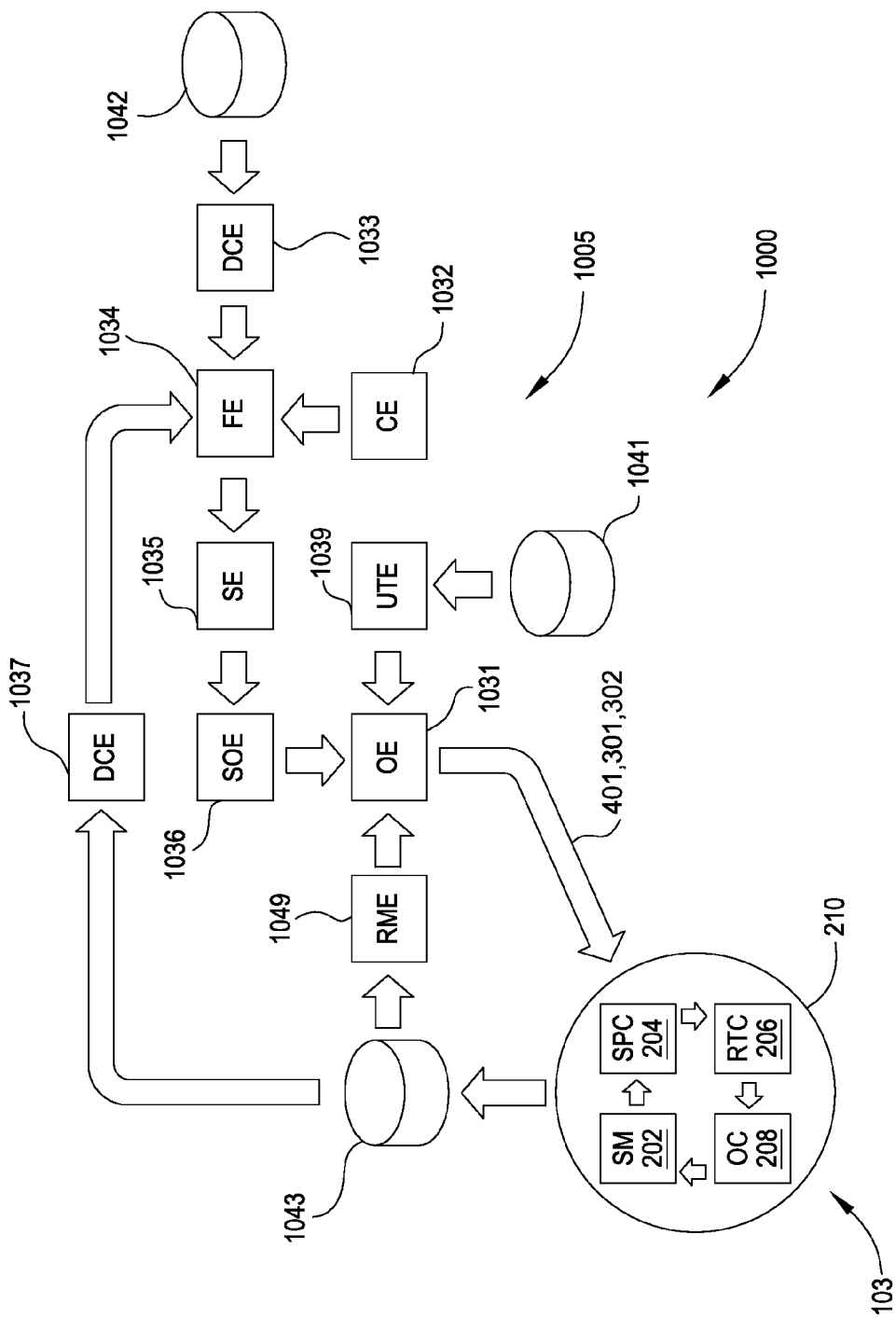
FIG. 9 illustrates a control system that includes an optimization engine and is configured to generate operating parameters for an energy storage system controller, according to one embodiment of the invention.

As noted above, operating parameters such as optimized runtime parameters 401, demand set-point curves 301, and battery state-of-charge profiles 302, are computed through simulations and other statistical techniques. FIG. 9 illustrates a control system 900 that includes an optimization engine 1031 and is configured to generate operating parameters for an energy storage system controller 210, according to one embodiment of the invention.

As shown, control system 900 is coupled to a system controller 210 and includes an optimization engine 1031, a coefficient engine 1032, data cleansing engines 1033 and 1037, a forecast engine 1034, a simulation engine 1035, a solution engine 1036, a utility tariff engine 1039, a universal tariff data store 1041, an external data store 1042, a site telemetry data store 1043 and a risk management engine 1049.

Optimization engine 1031 may be configured as a cloud-based or local computing environment designed to compute forecasted solutions for all distributed energy storage systems 103 associated with control system 900. Generally, a solution may include a series of set point arrays (e.g., demand set-point curves 301) as well as forecasted battery curves (e.g., battery state-of-charge curves 302) to enable each distributed energy storage system 103 to optimize battery usage based on real-time site load at each electric load location 104 served. These set point arrays may contain multiple sets of time-based set-points, to accommodate daily changes in the utility tariff periods that may occur. For example, one set of set-points may be selected to maximize demand charge savings for a weekday, while another set of set-points may be selected to maximize demand charge savings for a weekend or holiday. The values of the set-points may vary from one type of load location 104 to another (e.g., hotels, car wash, house, apartments) and thus may be configured and controlled by the optimization engine 1031. Each battery curve is a set of time-based battery state-of-charge zones. If the local storage medium state-of-charge is monitored to drop into or below a certain zone in the battery curve, then the set-point is adjusted in desired increments to limit the discharging (or increase the charging) of the storage medium. Examples of the controlling components in the optimization engine that are used to compute forecasted solutions are discussed below.

The forecast engine 1034 is responsible for generating forward-looking forecasted load profiles (e.g., power usage as a function of time) for a given site. To generate the forecast for each of the distributed energy storage systems 103 associated with the control system 900, the forecast engine 1034 gathers all historical information as well as the latest weather and site-specific attributes. The forecast engine 1034 may be configured to generate forecast for a distributed energy storage system 103 periodically and/or whenever the distributed energy storage system 103 requests a forecast for a specific time, such as a remaining portion of a business day in which the current charge in the distributed energy storage system 103 outside a desired range.

The simulation engine 1035 can be configured as a model of each particular distributed energy storage system 103.

Given an operating configuration of a distributed energy storage system 103, load data, and specifics of the utility tariff for the electric load location 104 served by the distributed energy storage system 103, the simulation engine 1035 can optimize battery usage based on the economics of the tariff. The output of the simulation engine 1035 may be an optimized set point array and corresponding battery curve(s). In some embodiments, the simulation engine 1035 accommodates varying utility measured power intervals (UMPI). Thus, in such embodiments, the simulation engine 1035 can be configured to change a moving average based on the UMPI when generating a simulation and evaluating maximum demand.

The utility tariff engine 1039 may be configured as a cloud-based or local computing environment, and is responsible for managing the specifics of utility tariffs used by the optimization engine 1031 to generate a set point array. Each utility tariff applicable to a specific distributed energy storage system 103 may be stored in the utility tariff engine 1039. The utility tariff engine 1039 then uses this information to determine the periods of the day that require optimized battery usage. The utility tariff engine 1039 understands and uses the weekday, weekend, and holidays, as well as the changes in rates within each tariff time period (e.g., minute, hour, day or week), to help form an optimized control solution for one or more of the distributed energy storage systems. The utility tariff engine 1039 may also monitor utility-specific events, such as peak day pricing or changing tariff rates.

Figure 10:
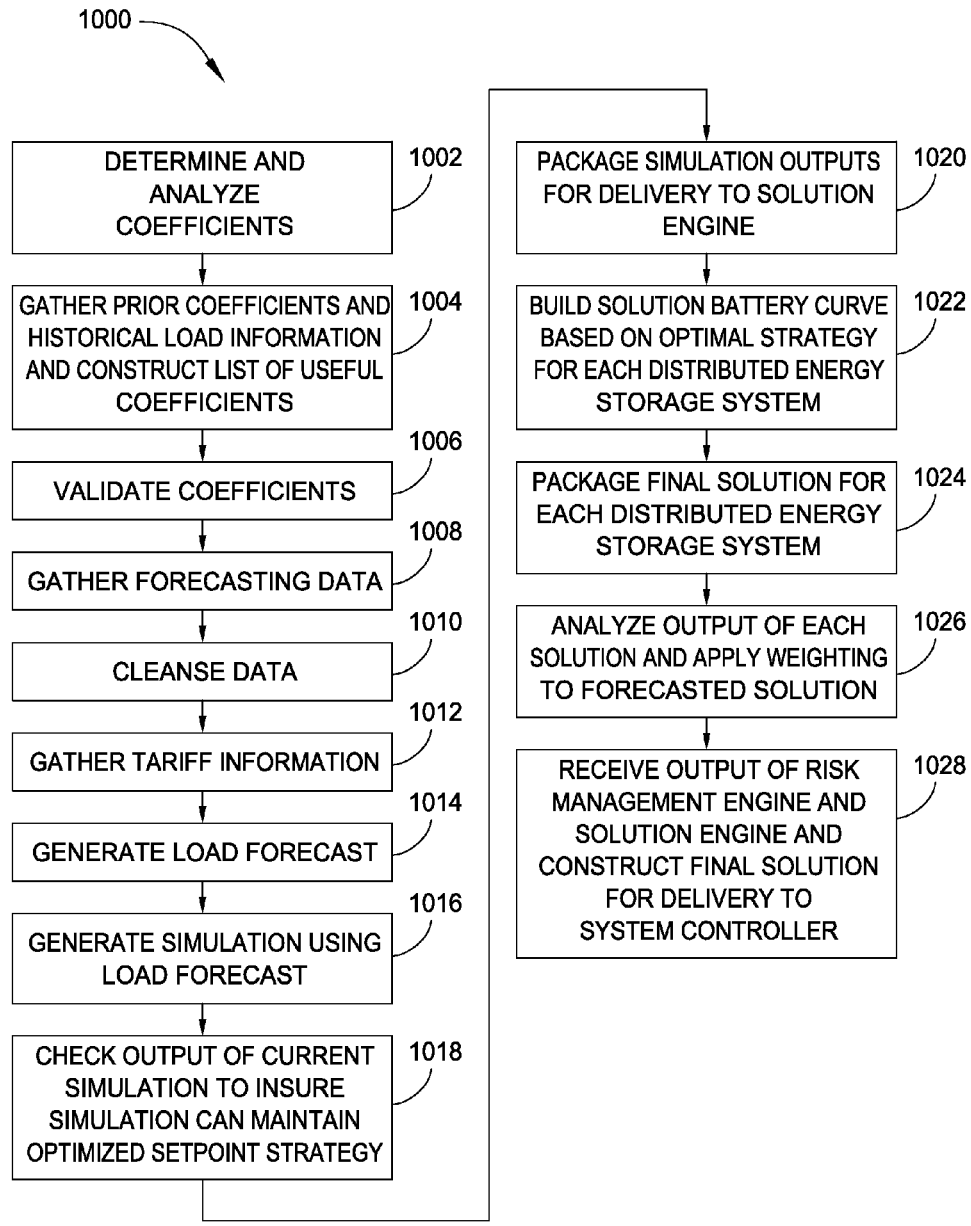
FIG. 10 is a block diagram of a general process sequence used by a control system to create and deliver forecast and control information to one or more distributed energy storage systems, in accordance with an embodiment of the invention.

FIG. 10 is a block diagram of a general process sequence 1000 used by the control system 900 to create and deliver forecast and control information to one or more distributed energy storage systems 103, in accordance with an embodiment of the present invention. The information created in the processing sequence 1000 may include optimized runtime parameters 401, demand set-point curves 301, and battery state-of-charge profiles 302. This information may be used by the system controller 210 disposed in the one or more distributed energy storage systems 103 to both reduce total energy cost to the customer and to help the make the wider electric grid cleaner and more efficient by reducing overall peak power demand. Additional steps may be added in between the steps depicted in FIG. 10, as needed, to optimally control the one or more distributed energy storage systems 103 associated with control system 900. Similarly, one or more steps described herein may also be eliminated as needed without exceeding the scope of the invention. Portions of the process sequence 1000 are also described in greater detail in conjunction with FIGS. 11-16.

The process sequence 1000 begins at step 1002, where the coefficient engine 1032 of the control system 900 is used to determine and analyze coefficients for use in the control system 900. The coefficients determined in step 1002 are used within the forecast engine 1034 and other parts of the control system 900 to form an optimized control solution for each distributed energy storage system 103 associated with the control system 900. Thus, each of the one or more distributed energy storage systems 103 associated with the control system 900 uses a different optimized control solution to control the demand at each corresponding electric load location 104. The coefficients generally include weightings applied to current and historical data used by the controlling software in the forecast engine 1034 to generate a forecast for a time period (e.g., a day, week, month or year) as to how various internal and external site-specific attributes will affect the power demand for each of the distributed energy storage systems 103 associated with the control system 900. Generally, these coefficients correspond to historical weather data, forecasted weather data, additional weather data such as cloud cover and sunrise/sunset times, and historical demand data collected for the site. These coefficients may also correspond to information associated with a business or businesses located at the electric load location 104, such as operating hours, business hours, scheduled maintenance, special events at the location, special events taking place nearby that may affect location (e.g., a parade), and other useful data that will help forecast the demand at a particular electrical load location 104.

In step 1004, the coefficient engine 1032 gathers a list of prior coefficients used by a distributed energy storage system 103 from an operation database (e.g., memory location) associated with the control system 900, gathers historical premises load information from a load telemetry database associated with the control system 900, gathers other external historical data from the external data store 1042, and constructs a list of coefficients that will be useful to help control each of the distributed energy storage systems 103. During the construction process, the coefficient engine 1032 compares the received data and combines like data to form an optimum data stream for the generation of the coefficient that can be used in the forecast engine 1034 for each distributed energy storage system 103. In one example, historical and forecasted weather data are compared and combined so that the predicted weather conditions can be factored into how the one or more distributed energy storage systems 103 associated with the control system 900 may react to changes in load at any instant in time at each respective electrical load location 104.

In step 1006, the coefficient engine 1032 validates the coefficients created in step 1004 to ensure that these coefficients will improve the way the distributed energy storage systems 103 reacts to simulated changes in load at any instant in time at each electrical load location 104. The validation process may include running historical forecasts using historical coefficient data sets and comparing results of the forecast to actual load characteristics received from each electrical load location 104. If the results of the forecast qualitatively shows an improvement in how the system reacts with the newly generated coefficients versus the current or previously used coefficients, the coefficient engine 1032 will transfer the validated coefficients to the forecast engine 1034.

In step 1008, the forecast engine 1034 gathers forecasting data for each distributed energy storage system 103 associated with control system 900. In some embodiments, this information is obtained from existing third party data providers, such as www.wunderground.com, www.weather.gov, and the like. In some embodiments, the forecasting data constructed in step 1008 is based on stored site characteristics for each distributed energy storage system 103. In such embodiments, the stored site characteristics may be formatted as a business hours time-based array.

In step 1010, the data-cleansing engine 1037 fills in any missing data using previously collected information, extrapolating the data or other useful techniques and adjusts any time-based intervals to match the desired interval of the forecast.

In step 1012, the utility tariff engine 1039 gathers specifics regarding each of the electric utilities' tariff, or tariffs, applicable for each electric load location 104 and constructs a data set for the solution engine 1036 to optimize operation of each distributed energy storage system 103 associated with the control system 900.

In step 1014, the forecast engine 1034 uses the latest coefficients from the coefficient engine 1032, coefficient data sets, and historical load data to generate a forecast of the load for each distributed energy storage system 103 for the appropriate period of time (e.g., month).

In step 1016, the simulation engine 1035 generates simulations of how a particular distributed energy storage system 103 operates given the forecasted load generated in step 1014. Outputs may include optimized set points (e.g., demand set-point curves 301) for each day and the state-of-charge (e.g., battery state-of-charge curves 302) of each distributed energy storage system 103 for the forecasted period.

In step 1018, the simulation engine 1035 checks the output of the current day's simulation to ensure the simulation can maintain the optimized set point strategy described by the demand set-point curves 301 generated in step 1016. If the check fails, then the optimization simulation is repeated with increased demand set-points in the period of the current day's failure and then validated against the new current simulation. This iterative process continues until both the optimized simulation and the current simulation can successfully maintain the optimized set point strategy using the same set points.

In step 1020, the simulation engine 1035 combines the simulation outputs of the default, optimized, and current results and packages them for delivery to the solution engine 1036.

In step 1022, the solution engine 1036 builds the appropriate solution battery curve based on the optimal strategy for each distributed energy storage system 103. Battery curve strategies are assigned to each distributed energy storage system 103 based on analysis of the load predicted for each distributed energy storage system 103. In some embodiments, the possible battery curve strategies that can be assigned include a flat battery curve, a stepped battery curve, a continuously varying battery curve, and a forecasted battery curve (battery state-of-charge profile 302). In such embodiments, a flat battery curve is generally used on load profiles with high demand volatility, a stepped battery curve is used when load profiles have heavy activity within predictable periods of a day or certain days of the week, and a forecasted battery curve is used when load profiles have large energy events for sustained periods of time. In some embodiments, as load changes over time at a particular electric load location 104, the corresponding distributed energy storage system 103 can be configured to adjust to the appropriate above-described battery curve strategy.

In step 1024, the solution engine 1035 combines the information output from the battery curve generation and the optimized set points from the simulation results and packages the solution (e.g., final solution for a time period) for each distributed energy storage system 103.

In step 1026, the risk management engine 1049 analyzes the output of each solution and applies a weighting to the forecasted solution to adjust how aggressive or conservative the solution should be for each particular distributed energy storage system 103. In some embodiments, the risk management engine 1049 bases such analysis on historical results of how forecasted solutions performed in the past as well as real-time economic drivers to adjust battery usage or ensure demand reduction within individual or groups of distributed energy storage systems 103 in the field.

In step 1028, the optimization engine 1031 receives the output of the risk management engine 1049 and solution engine 1035 and combines the data to construct a desired control solution for delivery to system controller 210 of each of the distributed energy storage systems 103 associated with control system 900.

Figure 11:
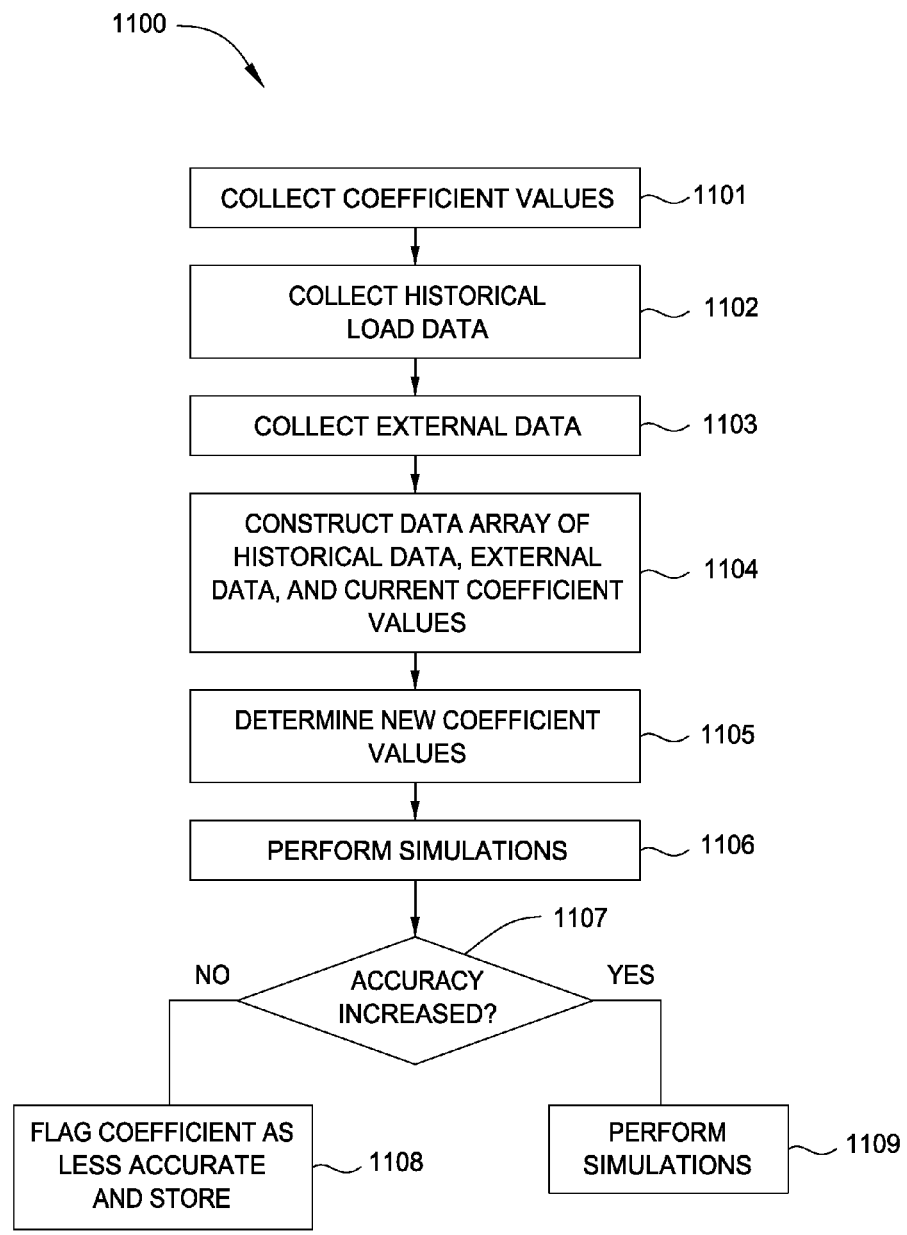
FIG. 11 is a block diagram of a process sequence used by a coefficient engine to create updated coefficients for one or more of the distributed energy storage systems associated with a control system, in accordance with an embodiment of the present invention.

FIG. 11 is a block diagram of a process sequence 1100 used by the coefficient engine 1032 to create updated coefficients for one or more of the distributed energy storage systems 103 associated with the control system 900, in accordance with an embodiment of the present invention. The process sequence 1100 may be performed periodically (e.g., once per month or billing cycle), or whenever optimization engine 1031 generates battery curves and/or demand set-point curves for a distributed energy storage system 103. Additional steps may be added to or eliminated from the process sequence 1100 as needed without exceeding the scope of the invention.

The process sequence begins at step 1101, in which the coefficient engine 1032 collects current coefficient values for one or more distributed energy storage systems 103. These coefficient values may be stored locally and/or in cloud-based storage.

In step 1102, the coefficient engine 1032 collects historical load data for the one or more distributed energy storage systems 103 of interest. This historical load data may be stored in an energy storage system telemetry database associated with the control system 900, which may be a storage device local to the coefficient engine 1032 or a cloud-based storage device.

In step 1103, the coefficient engine 1032 collects external data, such as weather forecasting information, schedules of events that may occur that may impact loading on the distributed energy storage systems 103 of interest, etc. This external data may be collected via the Internet and/or by any other technically feasible technique.

In step 1104, the coefficient engine 1032 constructs a data array of historical data, external data, and current coefficient values for the one or more distributed energy storage systems 103 of interest.

In step 1105, the coefficient engine 1032 performs a coefficient optimization algorithm to determine new coefficient values for the one or more distributed energy storage system 103 of interest. In some embodiments, the coefficient engine 1032 performs a non-linear mathematical analysis of the information included in the data array constructed in step 1104 to determine the improved new coefficient values in step 1105. The optimized coefficients are thus generated by use of the historical data, external data, and current coefficient values that have been received.

In step 1106, using the new coefficient values, the coefficient engine 1032 performs one or more simulations of the one or more distributed energy storage system 103 of interest.

In step 1107, the coefficient engine 1032 validates the new coefficient values determined in step 1106 by determining if forecasted behavior of the one or more distributed energy storage system 103 of interest is more accurate using the new coefficient values. If accuracy of a forecast is shown to have increased using the new coefficient values in the simulation, e.g. actual energy consumption is better predicted, the processing sequence 1100 proceeds to step 1109. If forecast accuracy is not increased using the new coefficient values, the processing sequence 1100 proceeds to step 1108.

In step 1108, the coefficient engine 1032 flags the new coefficient values as less accurate than the current coefficients, and stores the new coefficient values for future analysis.

In step 1109, the new coefficients are provided to the one or more distributed energy storage system 103 of interest. In some embodiments, the new coefficient values are also stored in an operations database associated with the control system 900.

Figure 12:
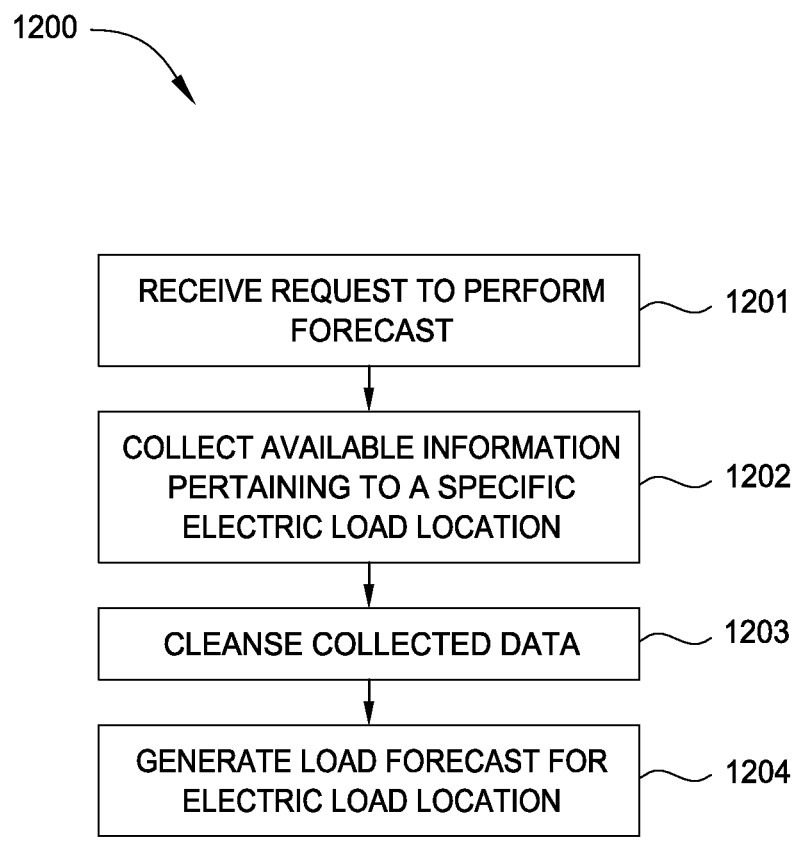
FIG. 12 is a block diagram of a process sequence used by a forecast engine to generate forward-looking forecasted load profiles for a particular electric load location serviced by a distributed energy storage system associated with the control system.

FIG. 12 is a block diagram of a process sequence 1200 used by the forecast engine 1034 to generate forward-looking forecasted load profiles for a particular electric load location 104 serviced by a distributed energy storage system 103 associated with the control system 900. Additional steps may be added to or eliminated from the process sequence 1200 as needed without exceeding the scope of the invention.

The process sequence begins at step 1201, in which the forecast engine 1034 receives a request to perform a forecast. Such a request may occur periodically for each electric load location 104 served by control system 900 or whenever a specific distributed energy storage system 103 may benefit from updated coefficients.

In step 1202, the forecast engine 1034 collects available information pertaining to the specific electric load location 104 of interest, including coefficients, historical load data, telemetry data of the distributed energy storage system 103, and the like. In some embodiments, weighting of the importance of different historical data is performed based on the duration of the forecast and/or how far into the future the requested forecast period takes place. For example, for a forecast that extends beyond seven to ten days, historical data may be weighted more heavily than weather forecast data that is further out into the future, since the accuracy of weather forecasting decreases rapidly with time.

In step 1203, data collected in step 1202 is cleansed. In other words, the collected data are modified to minimize the effect of gaps in data due to outages, etc. In some embodiments, time intervals associated with different data sets are normalized to a uniform desired time interval, using interpolation, averaging, and the like. For example, algorithms included in the forecast engine 1034 may be configured for data measured at ten-minute intervals, but a specific data source may only be available in fifteen-minute intervals. In some embodiments, after time intervals are normalized, actual gaps in data are corrected by interpolation or other techniques. In some embodiments, the procedure by which such data are corrected is a function of the duration of the data gap. For example, if the duration of a data gap is on the order of minutes or seconds, a moving average may be used to make a suitable correction. If the duration of a gap is on the order of hours or day, historical data and/or forecast data generated by the forecast engine 1034 may be used.

In step 1204, the forecast engine 1034 generates a load forecast for the one or more electric load locations 104 of interest. The load forecast generated by the forecast engine 1034 can be used by the simulation engine 1035 to generate a solution result for a particular distributed energy storage system 103.

Figure 13:
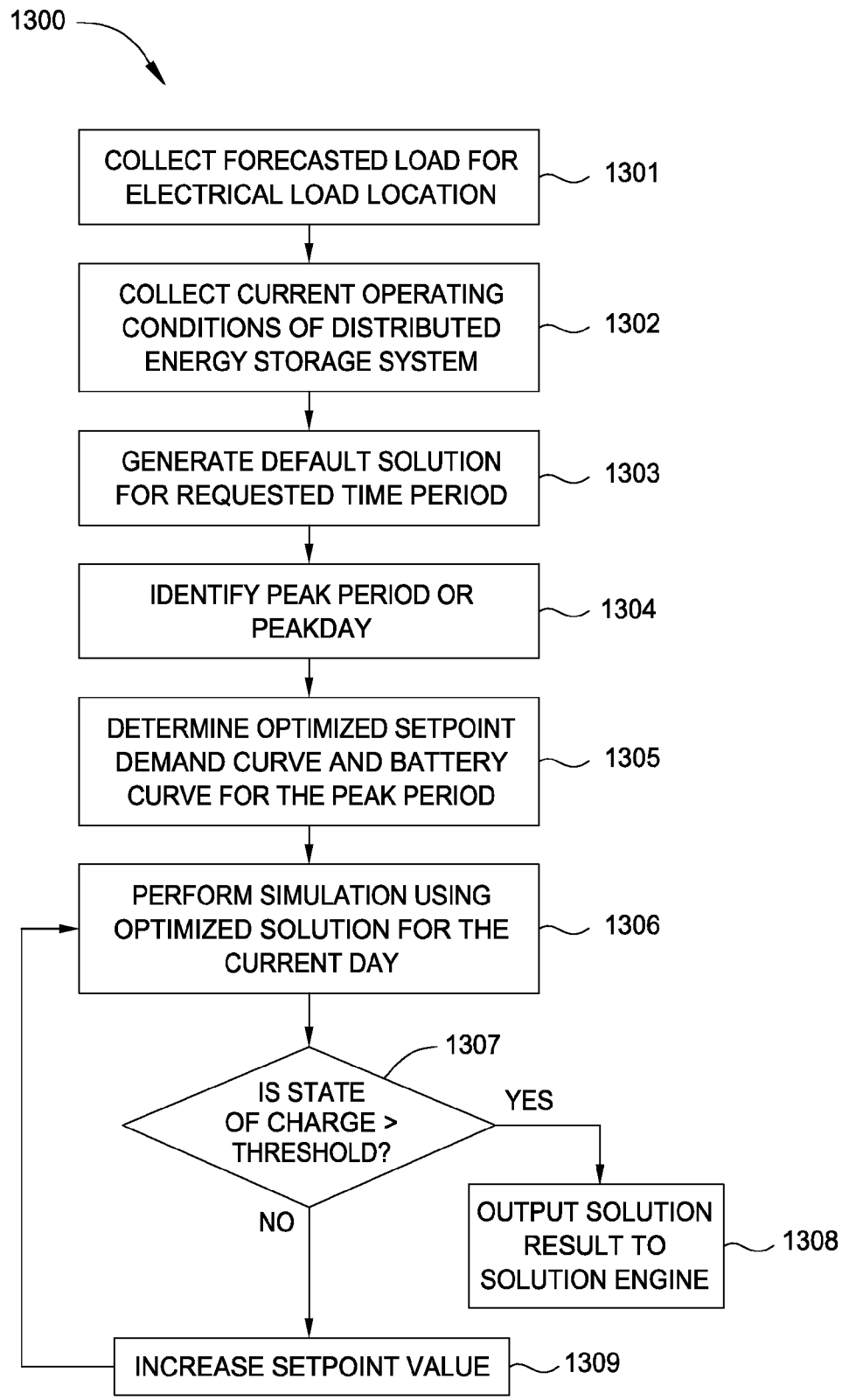
FIG. 13 is a block diagram of a process sequence used by a simulation engine to determine optimal set-points and battery curves, according to an embodiment of the invention.

FIG. 13 is a block diagram of a process sequence 1300 used by the simulation engine 1035 to determine optimal set-points and battery curves, according to an embodiment of the invention. The simulation engine 1035 determines optimal set-points and battery curves for a particular electric load location 104 serviced by a distributed energy storage system 103 associated with the control system 900. The simulation engine 1035 may be used periodically (e.g., once each month, day, billing period, etc.) to determine an optimized solution for the next such period. Alternatively, in some embodiments, the simulation engine 1034 may be used as part of an intervention, in which a distributed energy storage system 103 is unable to maintain a specified state-of-charge and requires updated battery curves and/or demand set-point curves for a remaining portion of a day, billing cycle, month, etc. Additional steps may be added to or eliminated from the process sequence 1300 as needed without exceeding the scope of the invention.

The process sequence 1300 begins at step 1301, in which the simulation engine 1035 collects a forecasted load for an electric load location 104 of interest from the forecast engine 1034 or a database associated with the control system 900 storing output from the forecast engine 1034.

In step 1302, the simulation engine 1035 collects the current operating conditions of the distributed energy storage system 103 associated with the electric load location 104 of interest. It is noted that accuracy of the solution generated by the simulation engine 1035 may depend on how recently the current operation condition data was collected in step 1302. For example, when such data is even 15 to 30 minutes old, accuracy of a solution can be adversely affected. This is because a significant portion of energy available in a distributed energy storage system 103 can be discharged in that time. Such data related to the distributed energy storage system 103 may include current energy capacity, current state-of-charge, efficiency rating, total energy capacity, charge/discharge limits, etc.

In some embodiments, the simulation engine 1035 also collects applicable tariff information in step 1302, for example from the universal tariff data store 1041 in FIG. 9. In such embodiments, additional long-term tariff site-specific inform may be collected to ensure that the distributed energy storage system 103 can operate autonomously for an indefinite period of time. Such information may include holiday information and/or major tariff seasonal changes.

In step 1303, the simulation engine 1035 generates a default solution (using a "default" battery curve and demand set-point curve) for the time period for which the simulation is requested (e.g., a day, a month, a billing period, a remaining portion of a day, etc.). This simulation illustrates how well the distributed energy storage system 103 performs by providing a "default" battery drain curve for the time period of interest.

In step 1304, the simulation engine 1035 identifies the "peak" period of the billing period or other time period of interest. This peak period, or peak day, is the day or time period during which the distributed energy storage system 103 typically has the lowest state-of-charge due to higher power usage at the electric load location at these times. Thus, the peak day is the most difficult day during a billing period for the distributed energy storage system 103 to operate within desired parameters.

In step 1305, the simulation engine 1035 performs an analysis determining an optimized demand set-point curve and battery curve for the peak period or peak day determined in step 1304. Generally, in step 1035, tariff information is used to determine an economically optimal or otherwise efficient way in which to provide energy to the electrical load location 104.

In step 1306, the simulation engine 1035 runs a simulation using a generated optimized solution for the current day, i.e., using the load telemetry of the electric load location 104 of interest for the current day and the optimized battery state-of-charge profile and demand set-point curve determined in step 1305 for the distributed energy storage system 103.

In step 1307, the simulation engine 1035 checks the validity of the optimized solution by checking whether or not the state-of-charge of the distributed energy storage system 103 is reduced below a desired minimum or other threshold value during the simulation in step 1306. If the state-of-charge remains greater than the minimum threshold value throughout the simulation, process sequence 1300 proceeds to step 1308. If the state-of-charge drops below the minimum threshold value during the simulation, the process sequence 1300 proceeds to step 1309. Thus, in step 1307, proper operation of the new solution is confirmed prior to being distributed to the distributed energy storage system 103.

In step 1308, the simulation engine 1035 outputs the solution result to the solution engine 1036 for generating a solution for the distributed energy storage system 103. The solution result may include default, optimized, and current simulation results.

In step 1309, the simulation engine 1035 increases a set-point value in the time period or periods in which the state-of-charge of the distributed energy storage system 103 falls below the desired minimum or other threshold value. In some embodiments, the set-point value is increased by a relatively small amount, for example on the order of about 1 kW for an industrial location. The process sequence 1300 then proceeds back to step 1305 and continues until an optimized solution is obtained in which the state of charge of the distributed energy storage system 103 is reduced below a desired minimum or other threshold value.

Figure 14:
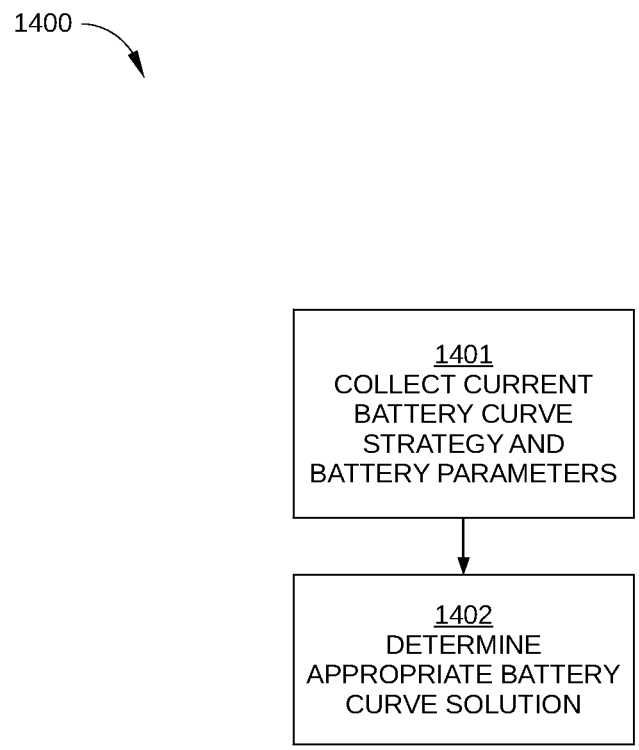
FIG. 14 is a block diagram of a process sequence used by a solution engine to generate a solution of optimal set-points and battery curves for a distributed energy storage system, according to an embodiment of the invention.

FIG. 14 is a block diagram of a process sequence 1400 used by the solution engine 1036 to generate a solution of optimal set-points and battery curves for a distributed energy storage system 103. Additional steps may be added to or eliminated from the process sequence 1400 as needed without exceeding the scope of the invention.

The process sequence 1400 begins at step 1401, in which the solution engine 1036 collects the current battery curve strategy and battery parameters (e.g., battery power, maximum charge capacity, etc.) for a distributed energy storage system 103.

In step 1402, the solution engine 1036 determines an appropriate battery curve strategy for the distributed energy storage system 103. Specifically, the solution engine 1036 selects one of a flat, stepped, continuously varying, or forecasted battery curve, based on previous behavior (i.e., historical load telemetry) for the distributed energy storage system 103 of interest. Other configurations of battery curve may also be selected by the solution engine 1036 in step 1402. Therefore, in one example, as the state-of-charge of the energy source 224 drops due to an increased load the system controller 210 will provide power to the electric load location 104 based on the control strategy defined by the battery curve.

Figure 15A:
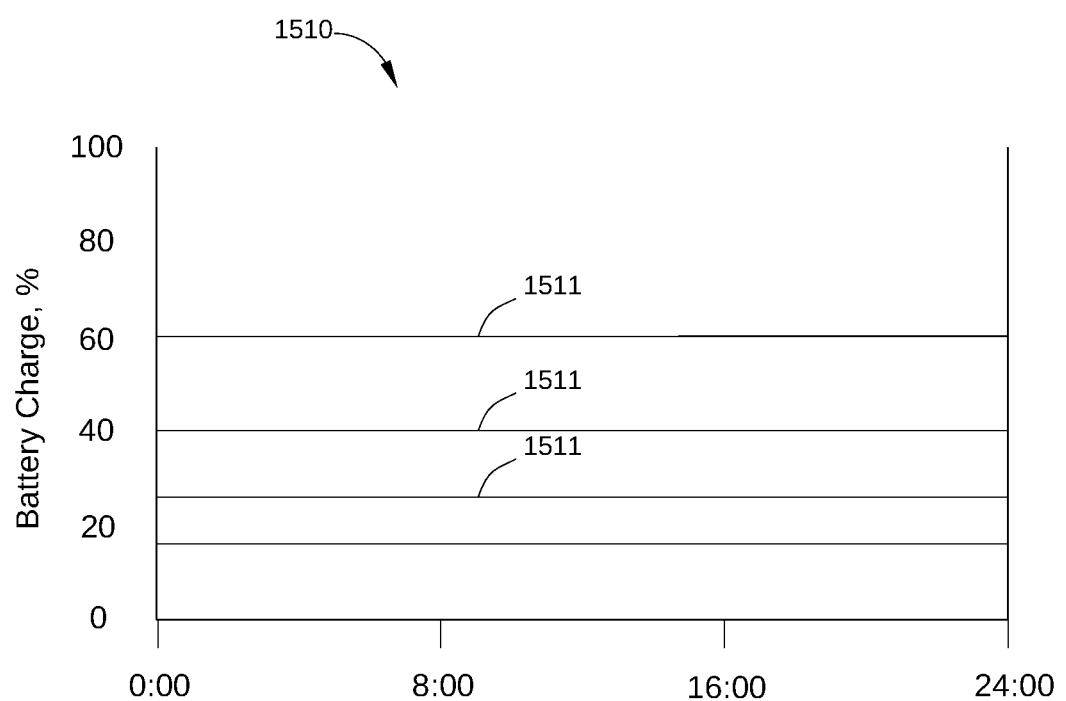
FIG. 15A illustrates a flat battery curve, according to an embodiment of the invention.

FIG. 15A illustrates one embodiment of a flat battery curve 1510. As shown, flat battery curve 1510 includes multiple target state-of-charge curves 1511. Each of the target state-of-charge curves 1511 indicates a target minimum state-of-charge for a distributed energy storage system 103 over a specific time period, for example for a single 24-hour period. In other words, each target state-of-charge curve 1511 provides a threshold state-of-charge value at any point in time. When state-of-charge is below this threshold value, the distributed energy storage system 103 is considered to be below an expected state-of-charge and helps to define how strongly the distributed energy storage system 103 should currently react to the changing state-of-charge so that the distributed energy storage system 103 can effectively respond to the current demand while also retaining enough energy to eliminate demand spikes at critical times later in the day. Consequently, in response to a current state-of-charge of the distributed energy storage system 103 falling below a target state-of-charge curve 1511, the system controller 210 adjusts demand set-point (e.g., a demand set-point curve 301), so that the distributed energy storage system 103 can still meet expected later demand.

As the current state-of-charge of the distributed energy storage system 103 falls below additional target state-of-charge curves 1511, the system controller 210 continues to adjust demand set-points. In some embodiments, such a set-point change is linear. For example, for each target state-of-charge curve 1511 that the current state-of-charge falls below, demand set-points are changed by the same amount, e.g., +1 kW. In other embodiments, such a set-point change can increase in a non-uniform fashion, such as a proportional response that increases as the current state-of-charge falls below additional target state-of-charge curves 1511. For example, for the first target state-of-charge curve 1511 that the current state-of-charge falls below, demand set-points are changed by +1 kW, for the second +5 kW, for the third +12 kW, and so on.

As shown in FIG. 15A, the target state-of-charge curves 1511 of the flat battery curve 1510 are substantially flat, and therefore do not vary with time. The flat battery curve 1510 has been shown to be effective on commercial load site profiles with high volatility, i.e., multiple demand peaks separated by periods of relatively low demand.

Figure 15B:
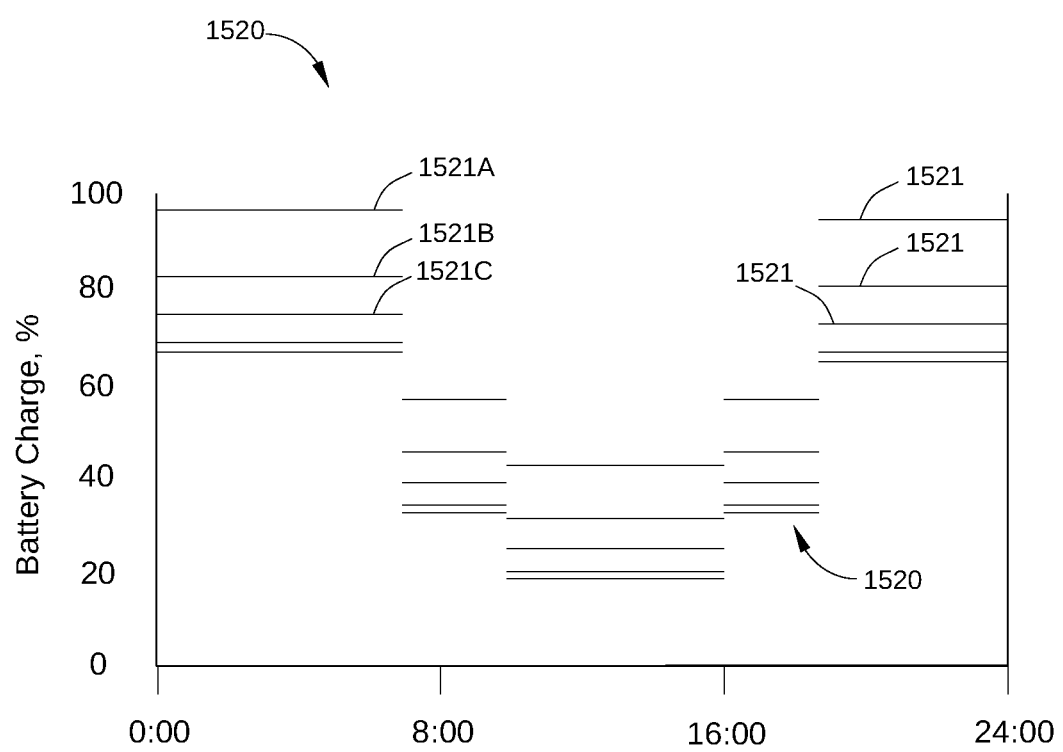
FIG. 15B illustrates a stepped battery curve, according to an embodiment of the invention.

FIG. 15B illustrates one embodiment of a stepped battery curve 1520. As shown, the stepped battery curve 1520 has a variable set-point. Specifically, the stepped batter curve 1520 includes multiple discontinuous target state-of-charge curves 1521, each indicating a target minimum state-of-charge for a distributed energy storage system 103 over a specific time period. Similar to the flat battery curve 1510, the stepped battery curve 1520 includes multiple curves (e.g., the target state-of-charge curves 1521) for any given time. Also, for any particular time period, any two target state-of-charge curves 1521 vary by a constant amount with respect to time, since each of the target state-of-charge curves 1521 is a substantially horizontal line segment. However, separation between adjacent target state-of-charge curves 1521 may be uniform. For example, target state-of-charge curves 1521A and 1521B may be separated by the same quantity of charge (e.g., 5% of battery charge) as target state-of-charge curves 1521B and 1521C. Alternatively, and as illustrated in FIG. 15B, separation between adjacent target state-of-charge curves 1521 may be non-uniform, for example proportional to distance from the highest target state-of-charge curve 1521. Unlike the flat battery curve 1510, the value of the target state-of-charge curves 1521 vary with time, and can therefore be tailored to address multiple heavy demand periods within predictable periods of a day or certain days of the week. Consequently, each of target state-of-charge curves 1521 may be a discontinuous function, as shown in FIG. 15B. In some embodiments, a stepped battery curve 1520 is used to optimize the performance of a distributed energy storage system 103. Thus, the general configuration of a stepped battery curve 1520 can be selected to manage how aggressive a distributed energy storage system 103 responds to changes in predicted load. Therefore, stepped battery curve 1520 can be configured to encourage distributed energy storage system 103 to maximize reduction in short-term spikes in demand or to maximize reduction in overall energy use at an electric load location 104. As illustrated in FIG. 15B the system will react more aggressively to changing load during the 10:00 to 16:00 time period versus the 0:00 to 7:00 and 18:00 to 24:00 time periods. Therefore, the distributed energy storage system will appropriately respond to demand in the less critical times, so that it can retain enough energy to eliminate demand spikes at the critical and/or costly times of the day (i.e., 10:00 to 16:00 at this electric load location).

Figure 15C:
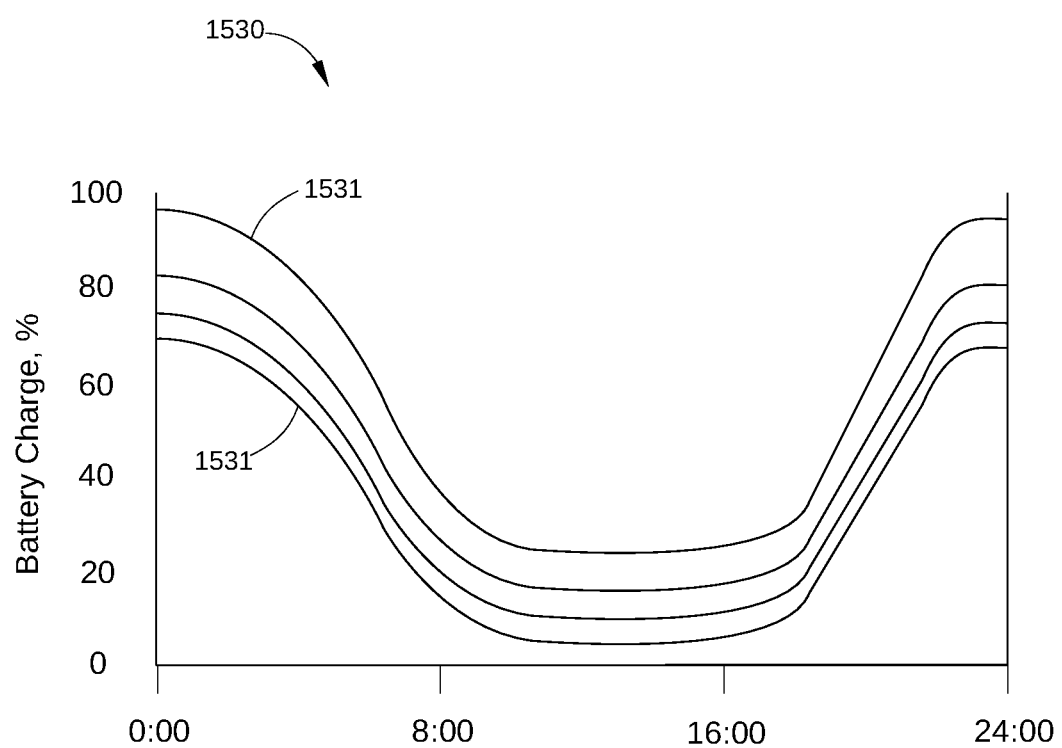
FIG. 15C illustrates a continuously varying battery curve, according to an embodiment of the invention.

FIG. 15C illustrates one embodiment of a continuously varying battery curve 1530. As shown, the continuously varying battery curve 1530 includes multiple target state-of-charge curves 1531, each indicating a target minimum state-of-charge for a distributed energy storage system 103 over a specific time period. Unlike stepped battery curve 1520, the target state-of-charge curves 1531 are continuous curves, and each of which may have a variable spacing in continuously varying battery curve 1530. As illustrated in FIG. 15C the system will react more aggressively to changing load during the 10:00 to 16:00 time period versus the 0:00 to 5:00 and 22:00 to 24:00 time periods. Therefore, the distributed energy storage system will appropriately respond to the demand in the less critical times, so that it can retain enough energy to eliminate demand spikes at the critical and/or costly times of the day (i.e., 10:00 to 16:00 at this electric load location).

In some embodiments, flat battery curve 1510, stepped battery curve 1520, and/or continuously varying battery curve 1530 may be a forecasted battery curve. Forecasted battery curve are formed by use of the forecast information received and analyzed by the solution engine, and provides an improved control in cases where the system can use the forecast information to prevent the system from over-reacting to expected periods of high use. Forecasted battery curves may be used effectively when load profiles have large energy events for sustained periods of time. In some embodiments, a forecasted battery curve may include an adjustable recovery period that can be configured to ensure complete recovery of the distributed energy storage system 103. An example of an adjustable recovery period 1533 is shown in FIG. 15C.

Returning to FIG. 14, in step 1403, after an appropriate battery curve strategy (flat, stepped, continuously varying, forecasted) for the distributed energy storage system 103 has been determined by the solution engine 1036, the solution engine 1036 collects information regarding the configuration of the distributed energy storage system 103.

In step 1404, the solution engine 1036 retrieves a simulation for the period of interest, such as an upcoming billing cycle, the remainder of the current business day, etc. As described above in conjunction with FIG. 13, the simulation can be generated by the simulation engine 1035, and the solution result may include default, optimized, and current simulation results.

In step 1405, the solution engine 1036 constructs aggregated state-of-charge battery curves. Specifically, the default, optimized, and current battery curves from the simulation results are combined. For example, in some embodiments, a median value of the default, optimized, and current battery curves is constructed. In some embodiments one or more of the default, optimized, and current battery curves are weighted differently. In some embodiments, the aggregated state-of-charge battery curve can be constructed using information from the default, optimized, and current battery curves (e.g., maximum and minimum values, etc.) in other ways as well. For example, in one embodiment, the default, optimized, and current battery curves are used to generate a maximum, minimum and median value at each time interval, and then a maximum, a minimum, and a median battery curve are constructed.

In step 1406, the solution engine 1036 constructs a battery curve using the selected strategy. For example, to construct a flat battery curve, the solution engine 1036 may use maximum and minimum state-of-charge values determined in step 1405 and then select intervening target state-of-charge curves, similar to target state-of-charge curves 1511 in FIG. 15A, using a resolution parameter that defines separation between each target state-of-charge curve. To construct a stepped battery curve, the solution engine 1036 may use the minimum state-of-charge values determined in step 1405 to calculate a maximum state-of-charge battery curve substantially similar to one of target state-of-charge curves 1521 in FIG. 15B. To construct a forecasted battery curve, the solution engine 1036 may construct a master battery curve substantially similar to one of target state-of-charge curves 1531 in FIG. 15C. The solution engine 1036 may use a combination of the default, optimized, and current battery curves included in the solution result from the simulation engine 1035.

In step 1407, the solution engine 1036 outputs a set-point array (e.g., demand set-point curves 301) and a flat, step, continuously varying, or forecasted battery curve (e.g., battery state-of-charge curves 302).

Figure 16:
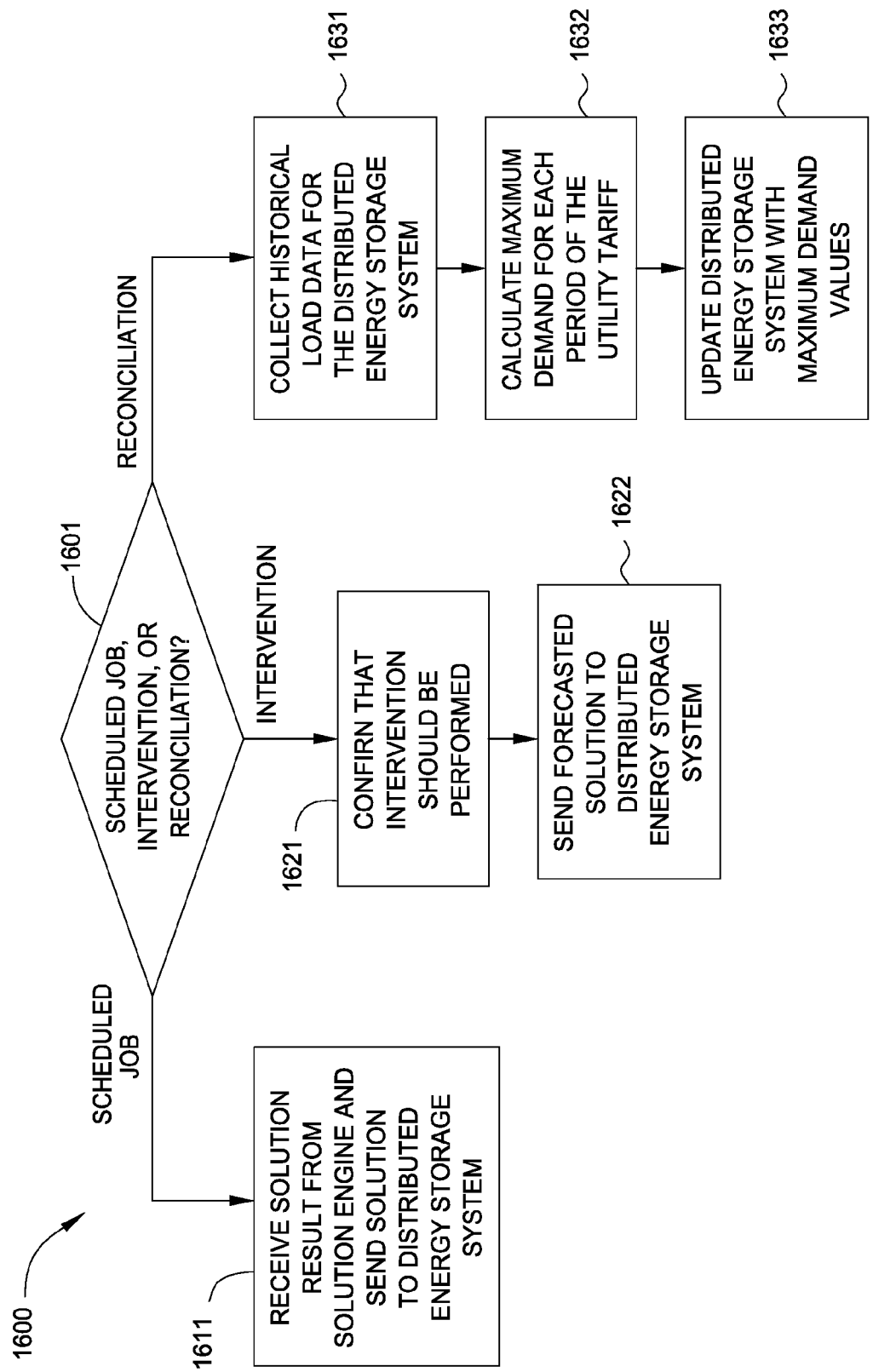
FIG. 16 is a block diagram of a process sequence used by an optimization engine to generate and distribute an optimal battery curve for a distributed energy storage system, according to an embodiment of the invention.

FIG. 16 is a block diagram of a process sequence 1600 used by the optimization engine 1031 to generate and distribute an optimal battery curve for a distributed energy storage system 103. The optimization engine 1031 may perform process sequence 1600 periodically (e.g., once each month, day, billing period, etc.) to determine an optimized solution for the next such period. Alternatively, in some embodiments, the optimization engine 1031 may be used as part of an intervention, in which a distributed energy storage system 103 is unable to maintain a specified state-of-charge and requires updated battery curves and/or demand set-point curves for a remaining portion of a day, billing cycle, month, etc. In addition, in some embodiments, the optimization engine 1031 may be used to perform a reconciliation, in which the optimization engine 1031 audits the performance of a distributed energy storage system 103 using historical data. Additional steps may be added to or eliminated from the process sequence 1600 as needed without exceeding the scope of the invention.

The process sequence 1600 begins at step 1601, in which the optimization engine 1031 determines whether a scheduled job, an intervention, or a reconciliation is requested. If a scheduled job is being performed, the process sequence proceeds to step 1611, if an intervention is being performed, the process sequence proceeds to step 1621, and if a reconciliation is being performed, the process sequence proceeds to step 1631.

In step 1611, the optimization engine 1031 receives a solution result from the solution engine 1036 and sends the solution result to the appropriate distributed energy storage system 103. The solution result may be a job that is performed on a monthly schedule, a daily schedule, based on a billing cycle, etc.

In step 1621, in which a software intervention is being performed, the optimization engine 1031 confirms that an intervention should be performed for the distributed energy storage system 103. For example, if an intervention has already been performed very recently for the same distributed energy storage system 103, the optimization engine 1031 may wait for a specified delay time before performing another intervention to allow the previous intervention to take effect.

In step 1622, the optimization engine 1031 generates a forecasted solution for the remainder of a current time period (e.g., for the remainder of a business day). In some embodiments, more up-to-date external data, such as weather data, may be incorporated into the forecasted solution.

In step 1623, the optimization engine 1031 sends the forecasted solution, which may include a set-point array (e.g., demand set-point curves 301) and/or a flat, stepped, continuously varying, or forecasted battery curve (e.g., battery state-of-charge curves 302) to the distributed energy storage system 103.

In step 1631, in which a reconciliation is being performed, the optimization engine 1031 collects historical load data for the distributed energy storage system 103 for the current billing cycle, for example from the site telemetry data store 1043.

In step 1632, the optimization engine 1031 calculates maximum demand for each period of the utility tariff.

In step 1633, the optimization engine 1031 updates the distributed energy storage system 103 with the maximum demand values determined in step 1632.

It is noted that the same concept of preparing a matrix of temporally synchronized charge state and demand set-point data in order to manage a distributed energy storage system can be applied to other embodiments. For example, a grid operator may use such data to control other distributed resources, such as a hydroelectric facility trying to match a certain changing demand while also maintaining a certain water level in the upstream reservoir. The same concept could be used for a municipal water district trying to maintain a certain reservoir level and/or water pressure at an autonomously controlled storage facility. The same concept could also be used to control a demand response system at a large electric load where the "battery" state is the demand reduction availability.

The process of managing an autonomous storage device can have other applications as well. Specifically, any system where a variable demand is preferred to be constant and a distributed supply resource, such as stored energy in the form of compressed air, electricity, or water for example, is used to create this consistency could benefit from this sort of control system. Furthermore, this process is not restricted by size of the supply or demand. For example, a substation configured with an autonomous storage system could automatically balance varying circuit loads by using this process, just as well as a single commercial site could use this system to balance its load. As an additional example, a hydroelectric facility (whether pumped storage or not, whether micro hydro or larger) could benefit from an autonomous control system to balance varying demands and circuit loads with the appropriately forecasted load data and intelligently generated operating parameters. Municipal water (both waste and drinking) could also benefit from such a control method. Water level, water pressure, and electricity generation are all examples of demands that such a control method could help keep constant with a distributed resource.

While the foregoing is directed to embodiments of the present invention, other and further embodiments of the invention may be devised without departing from the basic scope thereof, and the scope thereof is determined by the claims that follow.

We claim:

1. A system for controlling the transfer of energy between an electric load location and an electric grid, comprising:
   a power monitor in electric communication with an electric line that is coupled to an electric meter of an electric load location, wherein the electric meter is configured to measure energy transferred to the electric load location through the electric line;
   an optimization engine configured to receive one or more external inputs and create a set of operating parameters based on the one or more external inputs; and
   a system controller configured to use the set of operating parameters to:
      control a first transfer of energy from the electric line to an energy storage device, and
      control a second transfer of energy from the energy storage device to the electric line to maintain a rate of energy flow associated with the second transfer of energy below a threshold value, wherein the threshold value varies with time.

2. The system of claim 1, wherein the set of operating parameters are derived from simulations of energy use at the electric load location, and the simulations are performed by the optimization engine.

3. The system of claim 1, wherein the system controller comprises a set-point controller configured to vary the threshold value.

4. The system of claim 1, wherein the one or more external inputs are selected from a group consisting of weather information, sunrise and sunset information, power usage cost information, utility's billing period, geographic location, local solar production, local incident light, customer type, electric load location building specifications, grid operator data and time data.

5. The system of claim 1, wherein the system controller is configured to transmit information to the optimization engine, and the optimization engine is configured to update the set of operating parameters based on the information to vary the rate of energy flow through the electric line as a function of time.

6. The system of claim 1, wherein the one or more external inputs received by the optimization engine comprise a predicted power demand associated with the electric load location at a first time of day, and wherein the system controller comprises a set-point controller configured to change the threshold value from a first value to a second value based on the predicted power demand.

7. The system of claim 6, wherein the set-point controller is further configured to increase the threshold value from the second value to a third value based on determining that a state of charge of the energy storage device is below a second threshold value.

8. The system of claim 1, wherein the electric line is associated with an electric utility that delivers power to the electric load location.

9. A system for controlling energy transferred between an electric grid and an electric load location, comprising:
   an optimization engine configured to receive one or more external inputs and create one or more operating control curves based on the one or more external inputs; and
   a distributed energy storage device comprising a system controller and a power monitor configured to monitor an electric line that is coupled to an electric meter, wherein the system controller is configured to:
      compare the one or more operating control curves to information received from the power monitor and an energy storage device,
      control a first transfer of energy from the electric line to the energy storage device based on the comparison, and
      control a second transfer of energy from the energy storage device to the electric line, based on the comparison, to maintain a rate of energy flow associated with the second transfer of energy below a threshold value, wherein the threshold value varies with time.

10. The system of claim 9, wherein the one or more operating control curves comprise a battery state-of-charge curve that is used by the system controller to determine an amount of energy to transfer to the electric line based on a measured amount of charge in the energy storage device.

11. The system of claim 10, wherein the one or more operating control curves further comprise:
   a discrete or continuous demand set-point curve that is used by the system controller to determine two or more demand set-points, wherein the discrete or continuous demand set-point curve has a first value for a first time period and a second value for a second time period, the first value being different than the second value.

12. The system of claim 9, wherein the system controller further comprises a computer readable medium that is configured to store instructions that cause a processor to perform a process comprising:
   receiving a first set of operating parameters that are created based on one or more received external inputs; and
   based on the first set of operating parameters, varying the energy transfer from the energy storage device to the electric line to cause a rate of the second transfer of energy to remain below a threshold value, wherein the threshold value varies with time.

13. A system for controlling energy transferred between an electric grid and an electric load location, comprising:
an energy source;
a power monitor configured to monitor an electric line that is coupled to an electric meter of an electric load location, wherein the electric meter is used by a utility to determine power delivered to one or more electrical components disposed in the electric load location through the electric line;
a bi-directional power converter electrically coupled to the energy source and the electric line; and
a system controller configured to:
control a first transfer of energy from the energy source to the electric line via the bi-directional power converter, and
control a second transfer of energy from the electric line to the energy source, via the bi-directional power converter, to maintain a rate of energy flow associated with the second transfer of energy below a threshold value, wherein the threshold value varies with time.

14. The system of claim 13, further comprising:
an optimization engine configured to receive one or more external inputs and create a set of operating parameters based on the one or more external inputs, and
the system controller is configured to receive the set of operating parameters and use the set of operating parameters to control the second transfer of energy between the energy source and the electric line via the bi-directional power converter.

15. The system of claim 14, wherein the system controller is configured to transmit information to the optimization engine, and the optimization engine is configured to update the set of operating parameters based on the information to vary the power delivered through the electric line as a function of time.

16. The system of claim 13, wherein the energy source comprises one or more batteries.

17. A computer readable medium configured to store instructions executable by a processor of a host device, the instructions when executed by the processor causing the processor to:
monitor a first rate of energy transfer from an electric line to an electric load location;
control a second rate of energy transfer from the electric line to an energy storage device based on control parameters, wherein the control parameters are generated based on a simulation that is performed using forecast information, and wherein controlling the second rate of energy transfer alters the first rate of energy transfer; and
control a third rate of energy transfer from the energy storage device to the electric line, based on the control parameters, to maintain the third rate of energy transfer below a threshold value, wherein the threshold value varies with time.

18. The computer readable medium of claim 17, wherein the control parameters are generated by:
generating the forecast information by creating a forecast for a first time period based on one or more received external inputs; and
cleansing the one or more received external inputs by adjusting the information received from a first external input so that a time scale associated with the information received from the first external input matches a time scale associated with information received from a second external input.

19. The computer readable medium of claim 18, wherein the forecast is created based on received forecasted coefficient data and received historical coefficient data.

20. The computer readable medium of claim 18, wherein the external inputs are created from information selected from a group consisting of weather information, sunrise and sunset information, power usage cost information, utility's billing period, geographic location, local solar production, local incident light, customer type, electric load location building specifications, grid operator data and time data.

21. The computer readable medium of claim 17, wherein the control parameters comprise optimum demand set-points as a function of time and one or more battery curves that comprise a set of time-based battery state-of-charge curves.

22. The computer readable medium of claim 21, wherein the one or more battery state-of-charge curves comprise a flat battery curve, a continuously varying battery curve, a stepped battery curve, or a forecasted battery curve.

23. The computer readable medium of claim 17, wherein the control parameters are further generated by:
receiving electrical pricing information for the first time period; and
generating the control parameters based on the electrical power pricing information.

24. The computer readable medium of claim 23, wherein the control parameters are further generated by:
receiving electrical power tariff information for the first time period;
receiving energy storage device operation information, wherein the energy storage device operation information comprises at least one of the following:
state-of-charge information received from the energy storage device;
total charge capacity information received from the energy storage device;
charge discharge efficiency rating information received from the energy storage device; or
current energy capacity information received from the energy storage device; and
generating the control parameters based on a simulation that includes the electrical power tariff information.

* * * * *